(12) United States Patent
Hoffman et al.

(10) Patent No.: US 7,319,987 B1
(45) Date of Patent: *Jan. 15, 2008

(54) TOKENLESS FINANCIAL ACCESS SYSTEM

(75) Inventors: Ned Hoffman, Berkeley, CA (US); David Ferrin Pare, Jr., Berkeley, CA (US); Jonathan Alexander Lee, Berkeley, CA (US); Philip Dean Lapsley, Oakland, CA (US)

(73) Assignee: Indivos Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/215,058

(22) Filed: Dec. 17, 1998

Related U.S. Application Data

(63) Continuation-in-part of application No. 08/992,092, filed on Dec. 17, 1997, now abandoned, which is a continuation-in-part of application No. 08/963,555, filed on Nov. 3, 1997, now abandoned, which is a continuation-in-part of application No. 08/705,399, filed on Aug. 29, 1996, now Pat. No. 5,870,723.

(51) Int. Cl.
*G06Q 40/00* (2006.01)
(52) U.S. Cl. ...................................... 705/44
(58) Field of Classification Search ............... 902/3; 340/5.52, 5.53, 5.82, 5.83, 5.84; 705/18, 705/42, 43, 26, 44
See application file for complete search history.

(56) References Cited

U.S. PATENT DOCUMENTS

RE30,821 E * 12/1981 Goldman ................. 340/5.4

(Continued)

FOREIGN PATENT DOCUMENTS

EP 0598469 A2 5/1994

(Continued)

OTHER PUBLICATIONS

Anna Stockel, "Securing Data and Financial Transactions", Security Technology, 1995. Proceedings. Institute of Electrical and Electronics Engineers 29th Annual 1995 International Carnahan Conference; Oct. 18-20 1995; pp. 397-401.*

(Continued)

*Primary Examiner*—Eric W. Stamber
*Assistant Examiner*—John Van Bramer
(74) *Attorney, Agent, or Firm*—Marger, Johnson, & McCollom, P.C.

(57) ABSTRACT

The present invention shows a method and a device system for tokenless authorization of commercial transactions between a user and a seller. The user registers at least one registration biometric sample, and at least one user financial account. The seller registers with the computer system at least one seller financial account. The seller offers a proposed commercial transaction to the user, which includes price information. The user accepts the seller's proposed commercial transaction by adding to the proposed commercial transaction the user's personal authentication information. The bid biometric sample is forwarded to the computer system. The computer system compares the bid biometric sample with registration biometric samples. Upon successful match, a financial account of the user is debited and a financial account of the seller is credited, wherein a commercial transaction is conducted without the user having to use any portable man-made memory devices such as smart-cards or swipe cards.

21 Claims, 14 Drawing Sheets

U.S. PATENT DOCUMENTS

| | | | |
|---|---|---|---|
| 4,993,068 A * | 2/1991 | Piosenka et al. | 380/23 |
| 5,224,173 A * | 6/1993 | Kuhns et al. | 382/116 |
| 5,274,695 A | 12/1993 | Green | 379/88 |
| 5,291,560 A * | 3/1994 | Duagman | 382/117 |
| 5,335,288 A | 8/1994 | Faulkner | 382/4 |
| 5,412,738 A | 5/1995 | Brunelli et al. | 382/115 |
| 5,465,303 A | 11/1995 | Levison et al. | 382/124 |
| 5,485,510 A | 1/1996 | Colbert | 379/145 |
| 5,546,523 A | 8/1996 | Gatto | 395/156 |
| 5,615,277 A | 3/1997 | Hoffman | 382/115 |
| 5,719,950 A | 2/1998 | Osten et al. | 382/115 |
| 5,764,789 A * | 6/1998 | Pare, Jr. et al. | 382/115 |
| 5,787,187 A * | 7/1998 | Bouchard et al. | 382/115 |
| 5,870,723 A * | 2/1999 | Pare, Jr. et al. | 705/39 |
| 5,892,824 A | 4/1999 | Beatson et al. | 380/25 |
| 6,028,950 A | 2/2000 | Merjanian | 382/126 |
| 6,040,783 A | 3/2000 | Houvener et al. | 340/825.31 |
| 6,045,039 A * | 4/2000 | Stinson et al. | 235/379 |
| 6,070,141 A * | 5/2000 | Houvener et al. | 705/1 |
| 6,072,894 A * | 6/2000 | Payne | 713/186 |
| 6,105,010 A * | 8/2000 | Musgrave | 705/44 |
| 6,154,879 A * | 11/2000 | Pare, Jr. et al. | 902/3 |
| 6,202,151 B1 * | 3/2001 | Musgrave et al. | 713/186 |
| 6,259,805 B1 * | 7/2001 | Freedman et al. | 382/124 |
| 6,269,348 B1 * | 7/2001 | Pare, Jr. et al. | 705/39 |
| 6,310,966 B1 | 10/2001 | Dulude et al. | 382/115 |

FOREIGN PATENT DOCUMENTS

| | | | | |
|---|---|---|---|---|
| EP | 0 651 357 A1 | 5/1995 | | 7/12 |
| WO | WO 98/50875 | * 12/1998 | | |

OTHER PUBLICATIONS

Holmes et al., *A Performance Evaluation of Biometric Identification Devices*, Sandia National Laboratories, Albuquerque, NM, Jun. 1991.

* cited by examiner

Account Access Response Message

Account Access Response Message

Account Access Response Message

TOKENLESS FINANCIAL ACCESS SYSTEM

RELATED APPLICATION DATA

This application is a continuation-in-part of U.S. patent application Ser. No. 08/705,399, filed Aug. 29, 1996, now U.S. Pat. No. 5,870,723, issued Feb. 9, 1999 and which is commonly assigned, a continuation-in-part of U.S. patent application Ser. No. 08/992,092, filed Dec. 17, 1997, now abandoned, and a continuation-in-part of U.S. patent application Ser. No. 08/963,555, filed Nov. 3, 1997, now abandoned.

BACKGROUND OF THE INVENTION

The use of a token, an inanimate object which confers a capability to the customer presenting it, is pervasive in today's financial world. Whether a customer is buying groceries in a supermarket, or withdrawing money from an ATM, at the heart of the transaction is a money transfer enabled by a token, such as a plastic debit or credit swipe card, which acts to identify both the customer as well as the financial account being accessed.

From their inception in the late 1970s, token-based systems for accessing financial services have grown increasingly more prevalent in the banking industry. However, as token-based systems access have become more popular with customers, they have also become more popular with criminals intent on perpetrating fraud. Currently, fraud losses in the financial industry stem from many different areas, but they are mainly due to either stolen or counterfeit cards.

Generally, debit cards are used in conjunction with a personal identification number (PIN). The PIN helps to prevent lost or stolen cards from being used by criminals, but over time various strategies have been used to obtain PINS from unwary cardholders. Such strategies include Trojan horse automated teller machines (ATMs) in shopping malls that dispense cash but record the PIN, to fraudulent debit devices that also record the PIN, to criminals with binoculars that watch cardholders enter PINS at ATMs. The subsequently manufactured counterfeit debit cards are then used in various ATM machines to fraudulently withdraw funds until the account is emptied.

Customer-based fraud for debit cards is also on the rise. Customers intent on this sort of fraud will claim that they lost their card, say that their PIN was written on the card, and then withdraw money from their account using card, and then refuse to be responsible for the loss.

The financial industry is constantly taking steps to improve the security of tokens, such as debit cards and new smartcards. However, the linkage between the customer and his token remains tenuous, and that is the fundamental reason behind the increasing card fraud.

One solution that would reduce counterfeit-card fraud involves using a smartcard that includes a biometric. In this approach, authenticated biometrics are recorded from a customer of known identity and stored for future reference on a token. In every subsequent account access, the customer is required to physically enter the requested biometric, which is then compared to the authenticated biometric on the token to determine if the two match in order to verify customer identity.

Various biometrics have been suggested for use with smartcards, such as fingerprints, hand prints, voice prints, retinal images, handwriting samples and the like. However, the biometrics are generally stored on a token in electronic form, and thus the biometrics can be fraudulently copied and reproduced. Because the comparison and verification process is not isolated from the hardware and software directly used by the customer attempting access, a significant risk of fraud still exists.

An example of another token-based biometric smartcard system can be found in U.S. Pat. No. 5,280,527 to Gullman et al. In Gullman's system, the user must carry and present a credit card sized token (referred to as a biometric security apparatus) containing a microchip in which is recorded characteristics of the authorized user's voice. In order to initiate the access procedure, the user must insert the token into a terminal such as an ATM, and then speak into the terminal to provide a biometric sample for comparison with an authenticated sample stored in the microchip of the presented token. If a match is found, the remote terminal signals the host computer that the account access should be permitted, or may prompt the user for an additional code, such as a PIN which is also stored on the token, before authorizing the account access.

Although Gullman's reliance on comparing biometrics reduces the risk of unauthorized access as compared to PIN codes, Gullman's use of the token as the repository for the authenticating data combined with Gullman's failure to isolate the identity verification process from the possibility of tampering greatly diminishes any improvement to fraud resistance resulting from the replacement of a PIN with a biometric. Further, the system remains inconvenient to the customer because it requires the presentation of a token in order to authorize an account access.

Uniformly, the above patents that disclose financial authorization systems teach away from biometric recognition without the use of tokens. Reasons cited for such teachings range from storage requirements for biometric recognition systems to significant time lapses in identification of a large number of individuals, even for the most powerful computers.

Furthermore, any smartcard-based system will cost significantly more than the current magnetic stripe card systems currently in place. A PIN smartcard costs perhaps $3, and a biometric smartcard will cost $5. In addition, each station that currently accepts existing debit cards would need a smartcard reader, and if biometrics are required, a biometric scanner will also have to be attached to the reader as well.

This costly price tag has forced the industry to look for additional applications of the smartcard beyond simple banking and debit needs. It is envisioned that in addition to storing credit and debit account numbers and biometric or PIN authentication information, smartcards may also store phone numbers, frequent flyer miles, coupons obtained from stores, a transaction history, electronic cash usable at tollbooths and on public transit systems, as well as the customer's name, vital statistics, and perhaps even medical records.

The net result of this "smartening" of the token is increasing centralization of functions and increasing dependence on the token itself, resulting in increased vulnerability for the customer. Given the number of functions that the smartcard will be performing, the loss or damage of this all-important card will be excruciatingly inconvenient for the cardholder. Being without such a card will financially incapacitate the cardholder until it is replaced. Additionally, losing a card full of electronic cash may also result in a real financial loss as well.

Thus, after spending vast sums of money, the resulting system will be somewhat more secure, but will levy heavier penalties on the customer for destruction or loss of the card, To date, the banking industry has had a simple equation to balance: in order to reduce fraud, the cost of the card must increase. This cost is passed along to customers.

As a result, there has long been a need for an ATM access system that is highly fraud-resistant, practical, convenient for the customer, and yet cost-effective to deploy. There is also a need for an ATM access system that identifies the customer, as opposed to merely verifying a customer's possession of any physical objects that can be freely transferred. This will result in a dramatic decrease in fraud, as only the authentic customer can access his or her account.

A further need in an account access system is ensuring customer convenience by providing access without forcing the customer to possess, carry, and present one or more man-made memory devices in order to authorize an account access. All parties intent on fighting fraud recognize that any system that solves the fraud problem must take the issue of convenience into account, however the fundamental yet unrecognized truth of the situation is, the card itself is extremely inconvenient for the customer. This may not be initially obvious, but anyone who has lost a card, left a card at home, or had a card stolen knows well the keenly and immediately-felt inconvenience during the card's absence.

Yet another need in the industry is for a system that greatly reduces or eliminates the need to memorize cumbersome codes in order to access all of his accounts.

Yet another need in the industry is for a system that eliminates the need to memorize PIN codes.

There is further a need for a system that affords a customer the ability to alert authorities that a third party is coercing the account access without the third party being aware that an alert has been generated. There is also a need for a system that is able to effect, unknown to the coercing third party, temporary restrictions on the types and amounts of account accesses that can be undertaken.

Lastly, such a system must be affordable and flexible enough to be operatively compatible with existing networks having a variety of electronic access devices and system configurations.

SUMMARY OF THE INVENTION

The present invention satisfies these needs by providing a method and a device system for tokenless authorization of commercial transactions between a user and a seller using a computer system, the method comprising the steps of; a user registration step, wherein the user registers with the computer system at least one registration biometric sample, and at least one user financial account. In a seller registration step, the seller registers with the computer system at least one seller financial account. In a proposal step, the seller offers a proposed commercial transaction to the user, the proposed commercial transaction comprising price information. In an acceptance step, the user signals acceptance of the seller's proposed commercial transaction by adding to the proposed commercial transaction the user's personal authentication information comprising at least one bid biometric sample, wherein the bid biometric sample is obtained from the user's person. In a transmission step, the bid biometric sample is forwarded to the computer system. In a user identification step, the computer system compares the bid biometric sample with registration biometric samples for producing either a successful or failed identification of the user. In a payment step, upon determination of sufficient resources, a financial account of the user is debited and a financial account of the seller is credited, wherein a commercial transaction is conducted without the user having to use any portable man-made memory devices such as smart-cards or swipe cards. Preferably, in a presentation step, in any combination of the results of the above-mentioned steps are presented to the user or seller.

The invention also allows for a method and a system device for tokenless access to financial accounts provided by various institutions, the method comprising the steps of: a user registration step, wherein a user registers with a computer system one or more registration biometric samples, and one or more user financial accounts. In an initiation step, the user initiates an account access at an ATM by entering the user's personal authentication information comprising at least one bid biometric sample, wherein no portable man-made memory devices such as smartcards or swipe cards are used. In a transmission step, an account access request message comprising the personal authentication information is forwarded from the ATM to the computer system. In a user identification step, the computer system compares the personal authentication information in the account access request message with the registration biometric samples to produce either a successful or failed identification of the user. In an account retrieval step, wherein upon successful identification of the user, a financial account number of the user is retrieved; and an access step, wherein after successful identification of the user and successful financial account number retrieval, the user is allowed to access the user financial account.

Preferably, the method further comprises a financial operation step, wherein the user performs at least one action selected from the group comprising: obtaining cash, depositing funds, transferring funds between accounts, obtaining account balances, paying bills, and obtaining electronic cash.

Additionally, in a user resource determination step, after successful identification of the user, a determination is made if the user has sufficient resources to pay for the transaction. Preferably, during the user registration step, the user registers at least one user financial account and assigns an account index code to each user financial account, and during the acceptance step the user adds the account index code to the commercial transaction message, wherein the account index code further comprises one or more alphanumeric characters. This allows the computer system to use the account index code that was added to the commercial transaction message to select the corresponding user financial account. Additionally, an account index name is assigned to an account index code.

Preferably, a list of accounts with their account index names can be retrieved and displayed to the user after a successful identification, wherein no transaction needs to take place if it is desired that the account index names be retrieved.

In addition, during the payment step, a credit authorization draft is created detailing an agreement to pay the seller from the user's financial account up to an amount specified during the proposal step, whereby transactions can be conducted when the exact amount to be transferred is not known at the time of authorization or when a deposit is required but the account may not ever be debited.

The resource determination step and the payment step the computer system communicates with one or more external computer systems in order to perform any combination of the following steps: the resource determination or the construction of the credit authorization draft.

It is understood that the price information comprises any combination of the following: a list of goods and services, a seller name, a date and time, a location, or an invoice number. The acceptance step further comprises the user entering an amount that is the sum of a cash back value to the proposed transaction amount. The biometric sample comprises of one of the following: a fingerprint, a retinal image, and a voice print.

DETAILED DESCRIPTION

The invention provides a tokenless method for identifying users for the purpose of authorizing electronic financial transactions for consumers. It is the essence of this invention that consumers conduct these transactions without the use of a personal identification number ("PIN") or any tokens, such as credit cards, badges or identification cards including drivers licenses.

Figure 1:
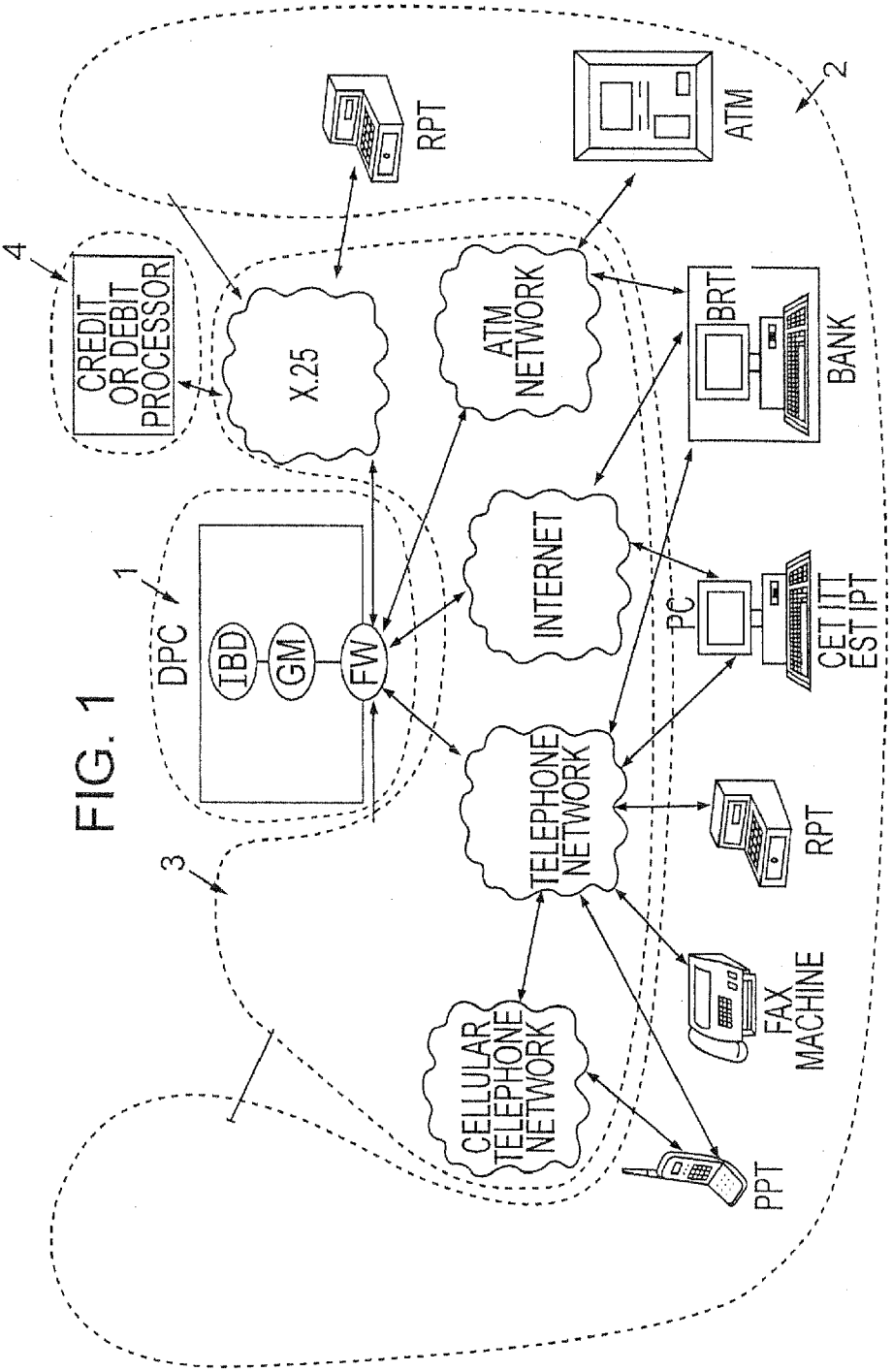
FIG. 1 shows the overall configuration of the invention and its components.
Figure 2:
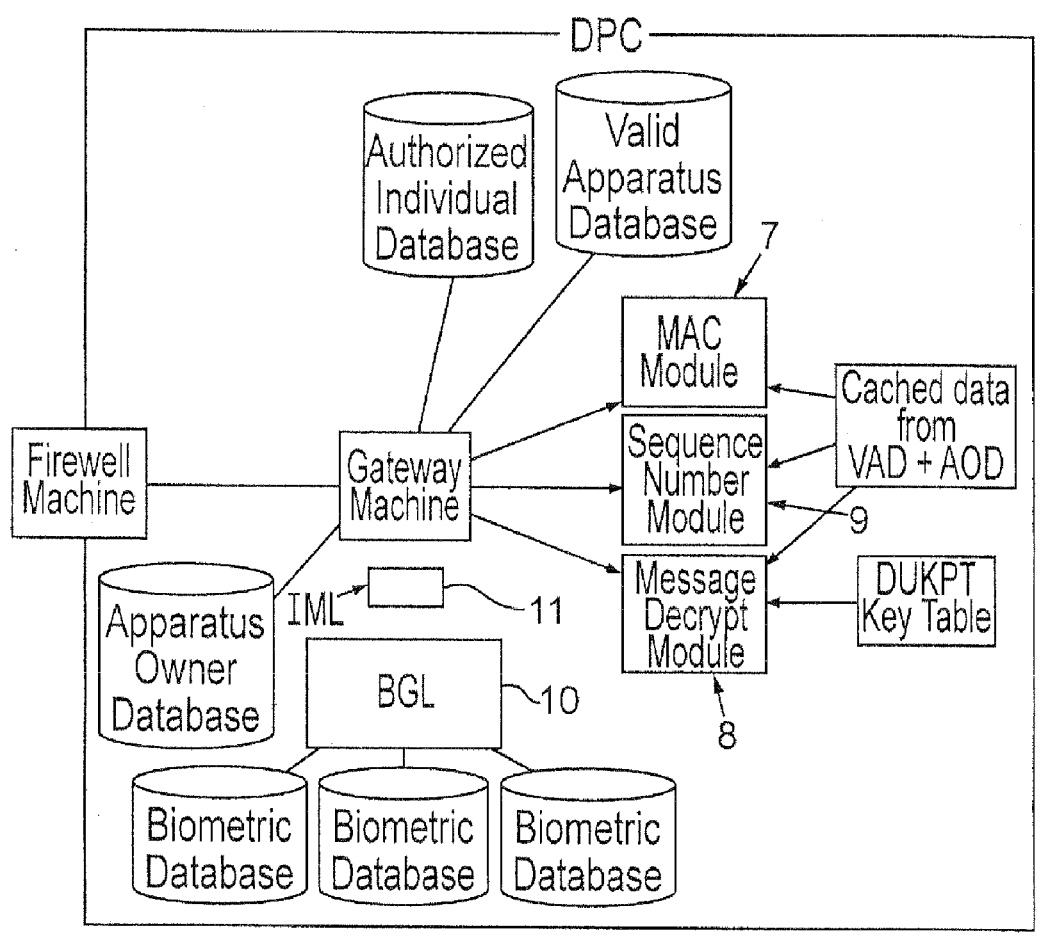
FIG. 2 shows the DPC containing several databases and software execution modules.

Turning now to the figures, the overall configuration of the invention and its components are shown in FIG. 1. Essentially a Data Processing Center (DPC) 1 is connected to various terminals 2 through various types of communication means 3. The DPC is also connected and communicates with independent computer networks 4. The DPC contains several databases and software execution modules as shown in FIG. 2. In a preferred embodiment of the invention, the databases are backed up or "mirrored" in distinct physical locations for safety reasons. The Firewall Machine is responsible for prevention of electronic intrusion of the system while the Gateway Machine is responsible for routing all requests from the user, including adding, deleting and otherwise modifying all databases.

Figure 3:
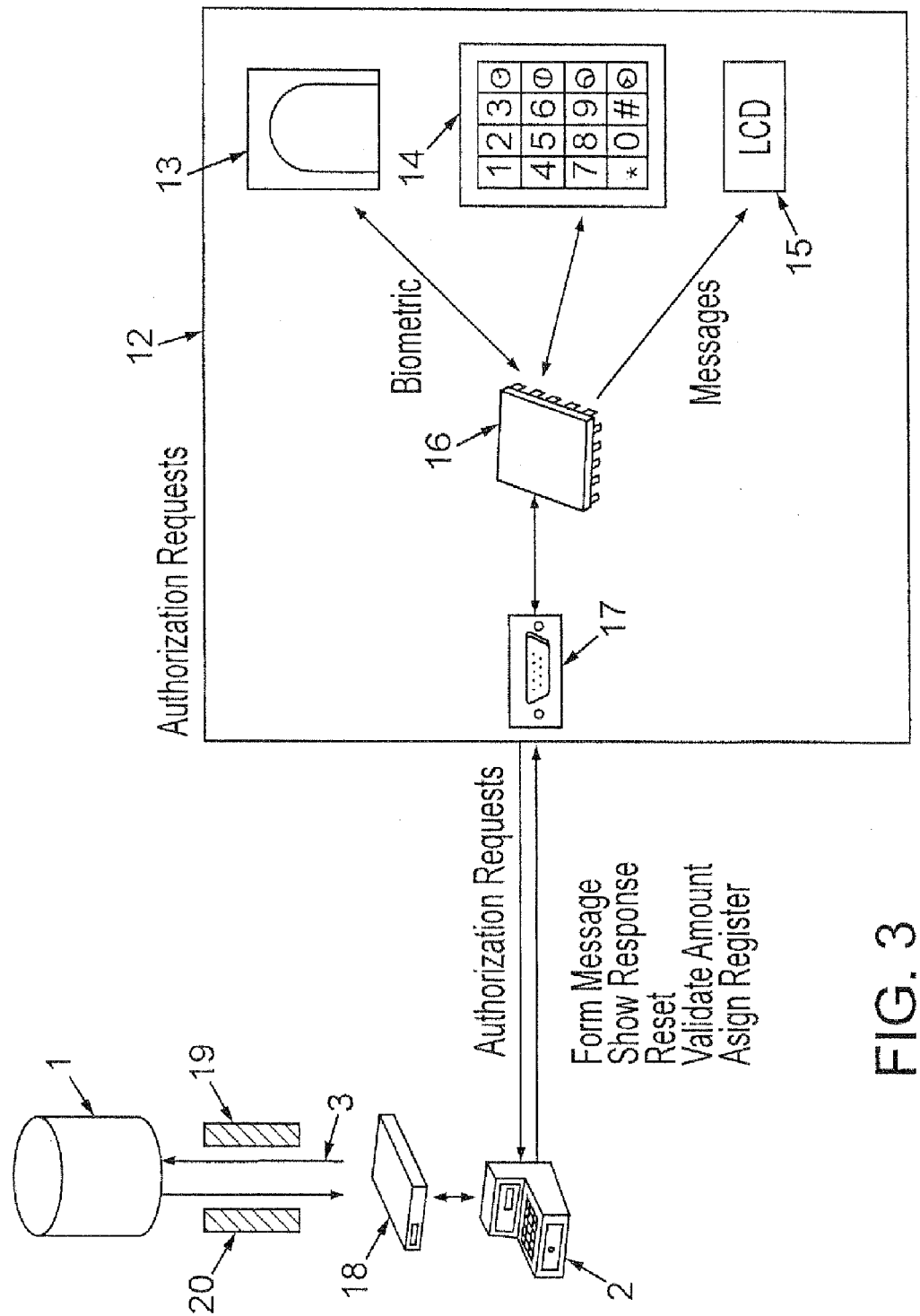
FIG. 3 shows an example of a terminal and the biometric input device.
Figure 4A:
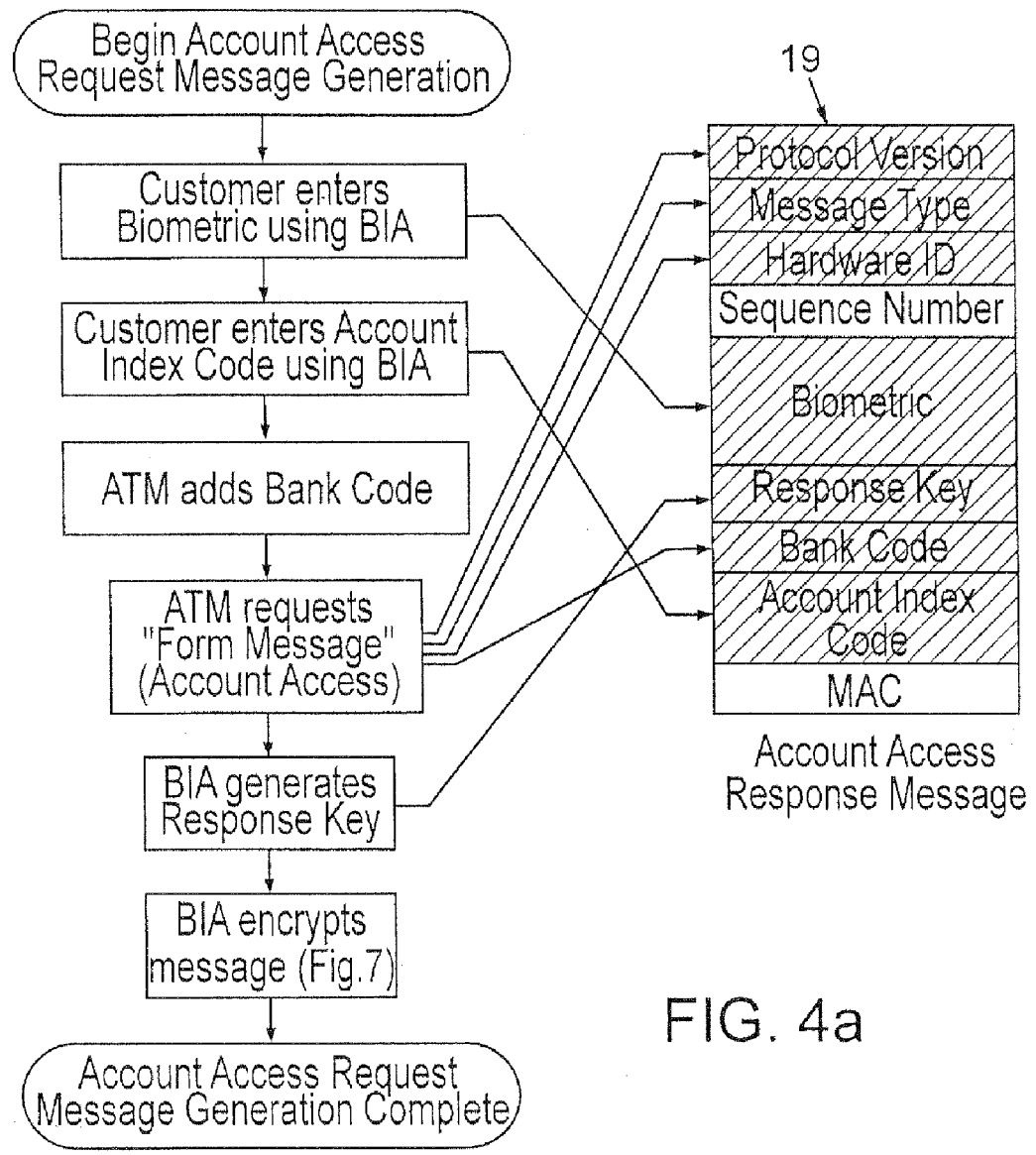
FIG. 4a is a description on the steps taken to process an electronic financial transaction, from proposal through presentation of results.

In a preferred embodiment, some of the communication between the terminal and the DPC are encrypted for enhanced security. The Gateway Machine is also responsible for decryption and de-packaging of encrypted data that has arrived from the terminals using the MACM module 7, MDM module 8, and the SNM module 9. The BGL module 10, and the IML module 11 are used to locate the biometric number. FIG. 3 depicts an example of a terminal 2 and the biometric input device 12, which has a biometric scanner 13, data entry means such as a key pad 14, and a display panel 15. The biometric scanner can be any one of fingerprint scanner, voice input device (microphone), palm print scanner, retinal scanner or the like, although the fingerprint scanner will be used as an example. The biometric input device is further equipped with computing modules 16, device drivers, and erasable and non-erasable memory modules. The biometric input device communicates with the terminal through preferably a serial port 17. The terminal 2 communicates through a modem 18 with the DPC 1 through messages 19 and responses 20 using one of the interconnecting means in FIG. 1 such as a cable TV network, cellular telephone network, telephone network, the Internet, or an X.25 network. FIG. 4a is a description on the steps taken to process an electronic financial transaction, from proposal through presentation of results.

Figure 4B:
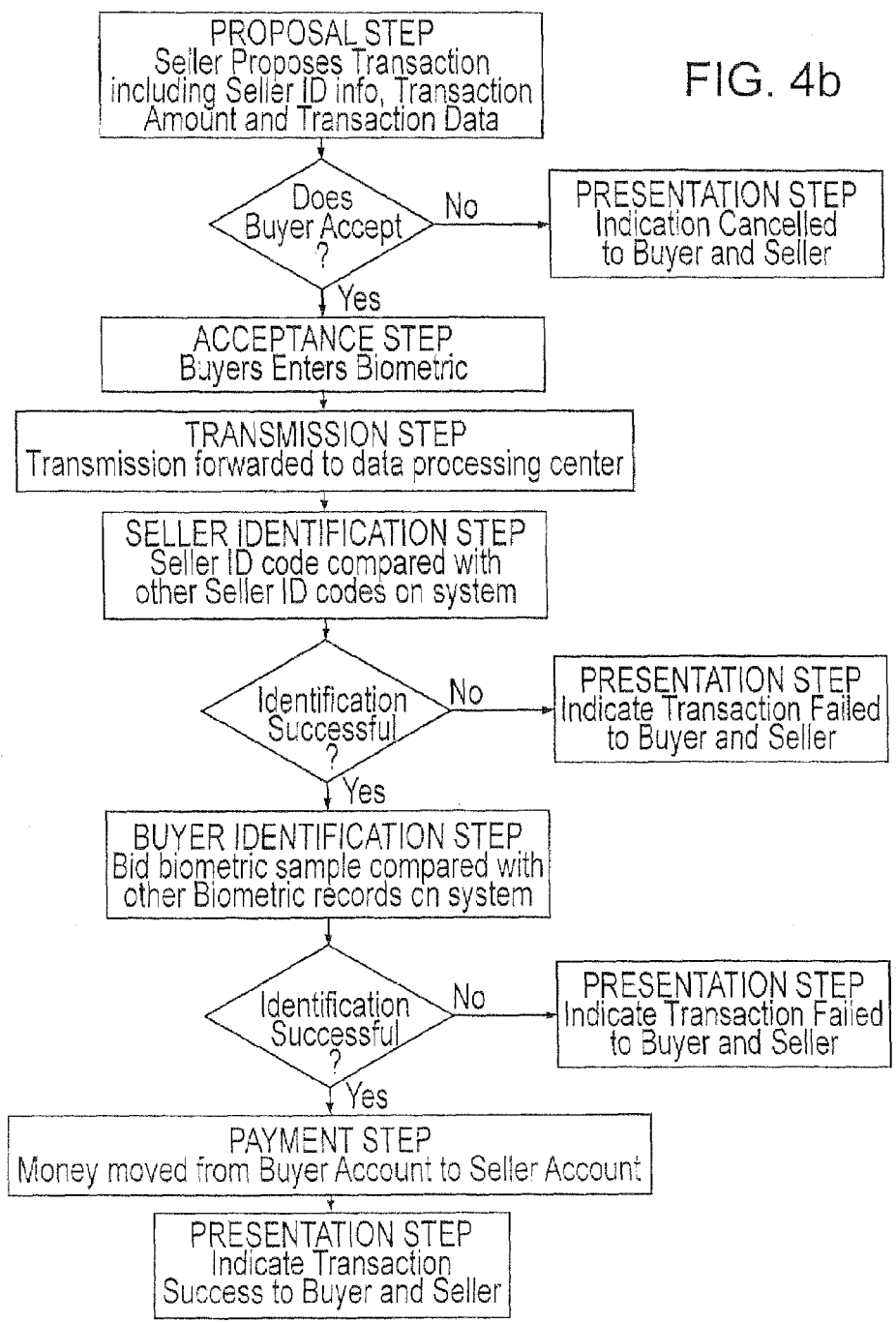
FIG. 4b shows the process of the formation and construction of an account access request message at the BIA.
Figure 5:
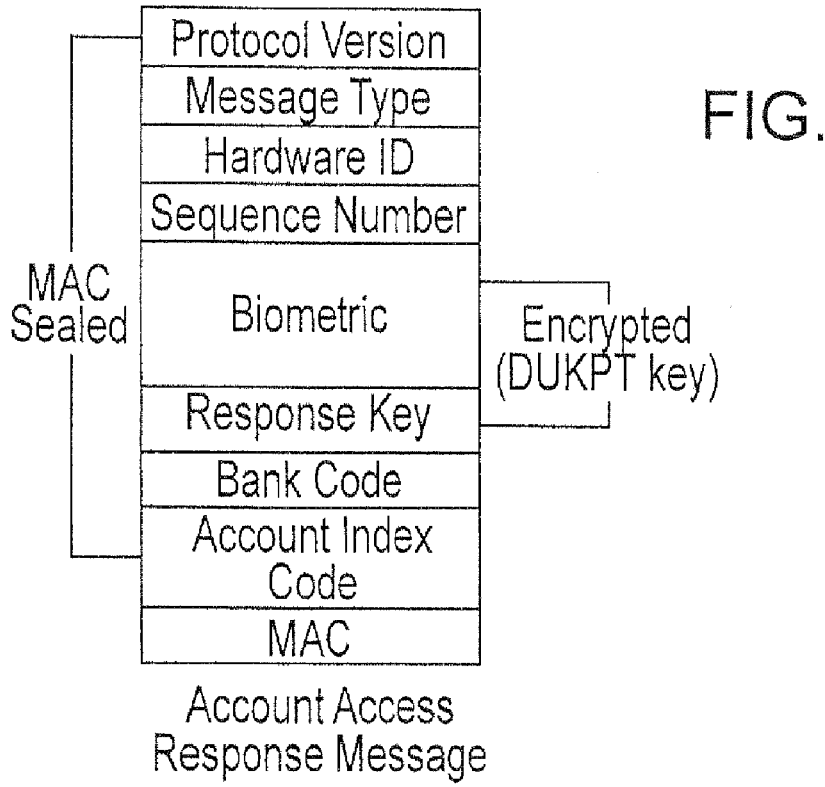
FIG. 5 and FIG. 6 show a representational diagram of the account access request and response messages.
Figure 6:
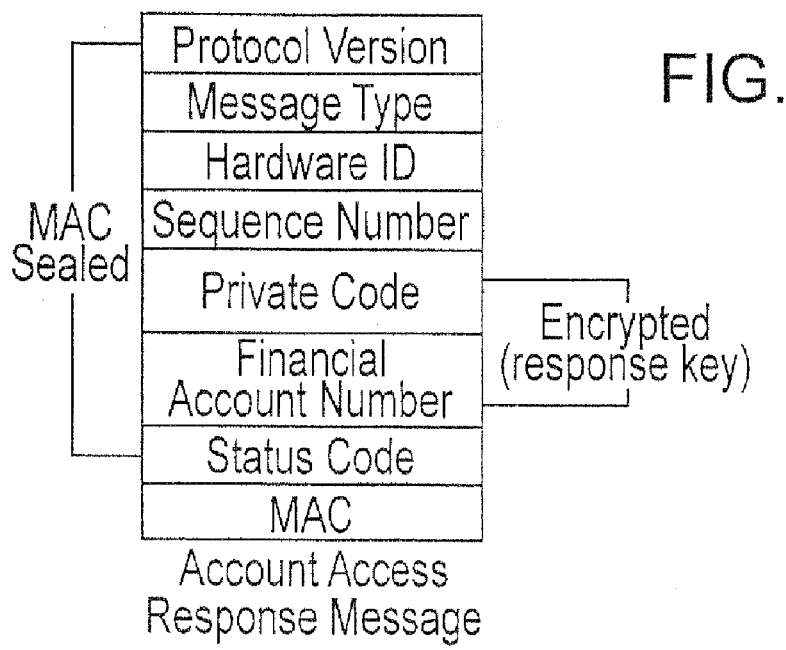
Figure 7:
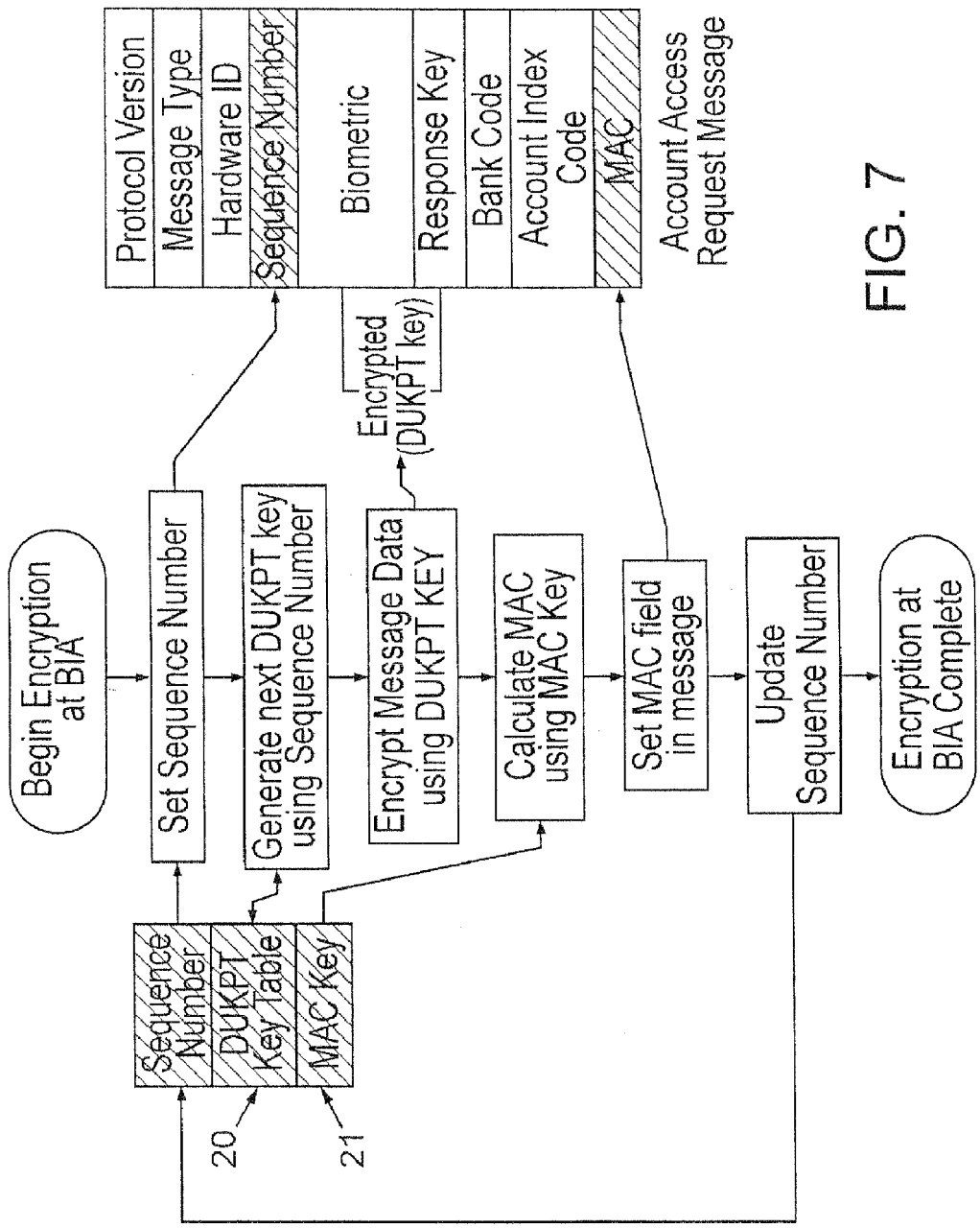
FIG. 7 is a block diagram of the overall process for data encryption and sealing showing the use of DUKPT key data for encryption of data before appending additional data before sealing the message with a Message Authentication Code (MAC).
Figure 8:
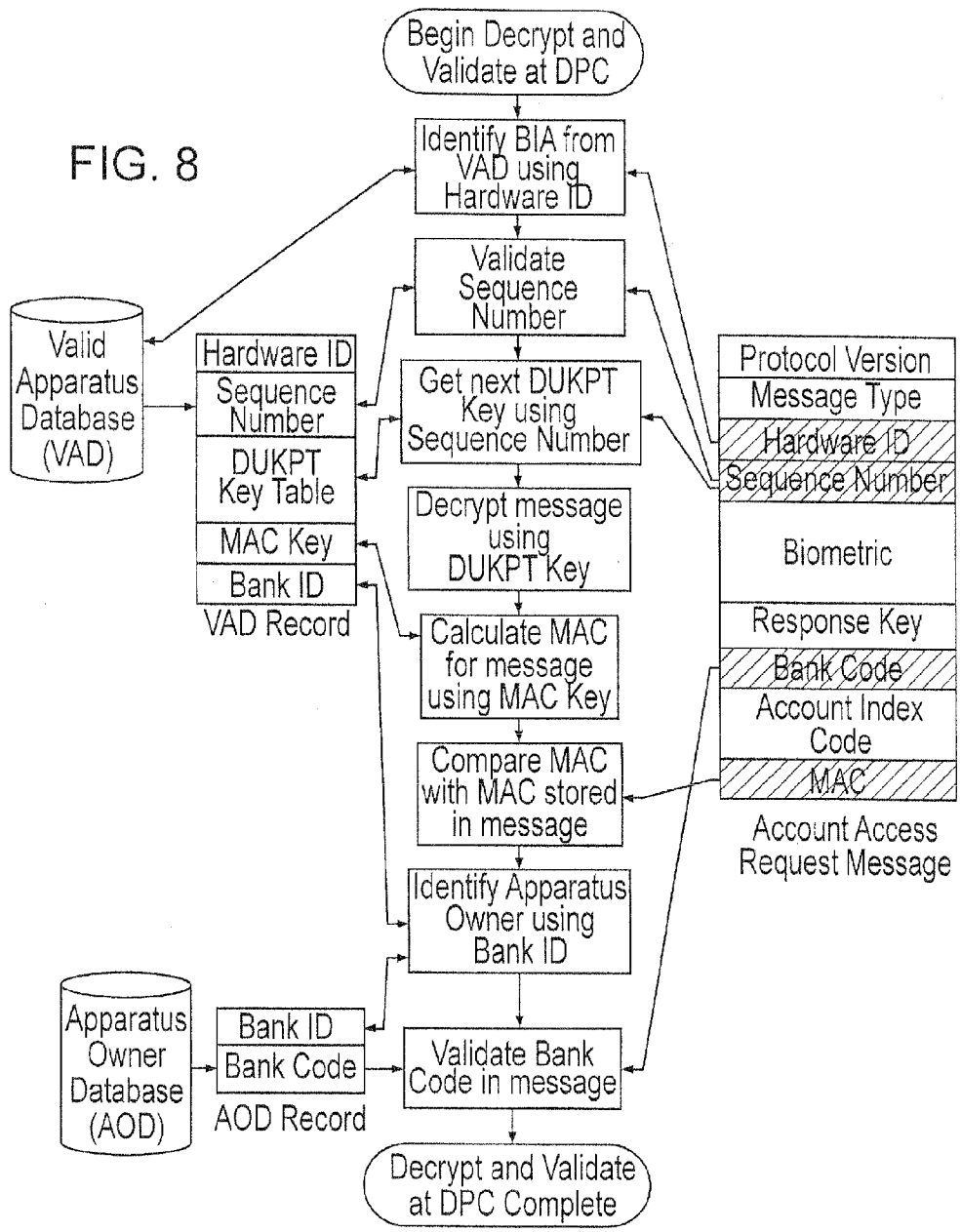
FIG. 8 and FIG. 9 show the decryption and encryption processes at the DPC.
Figure 9:
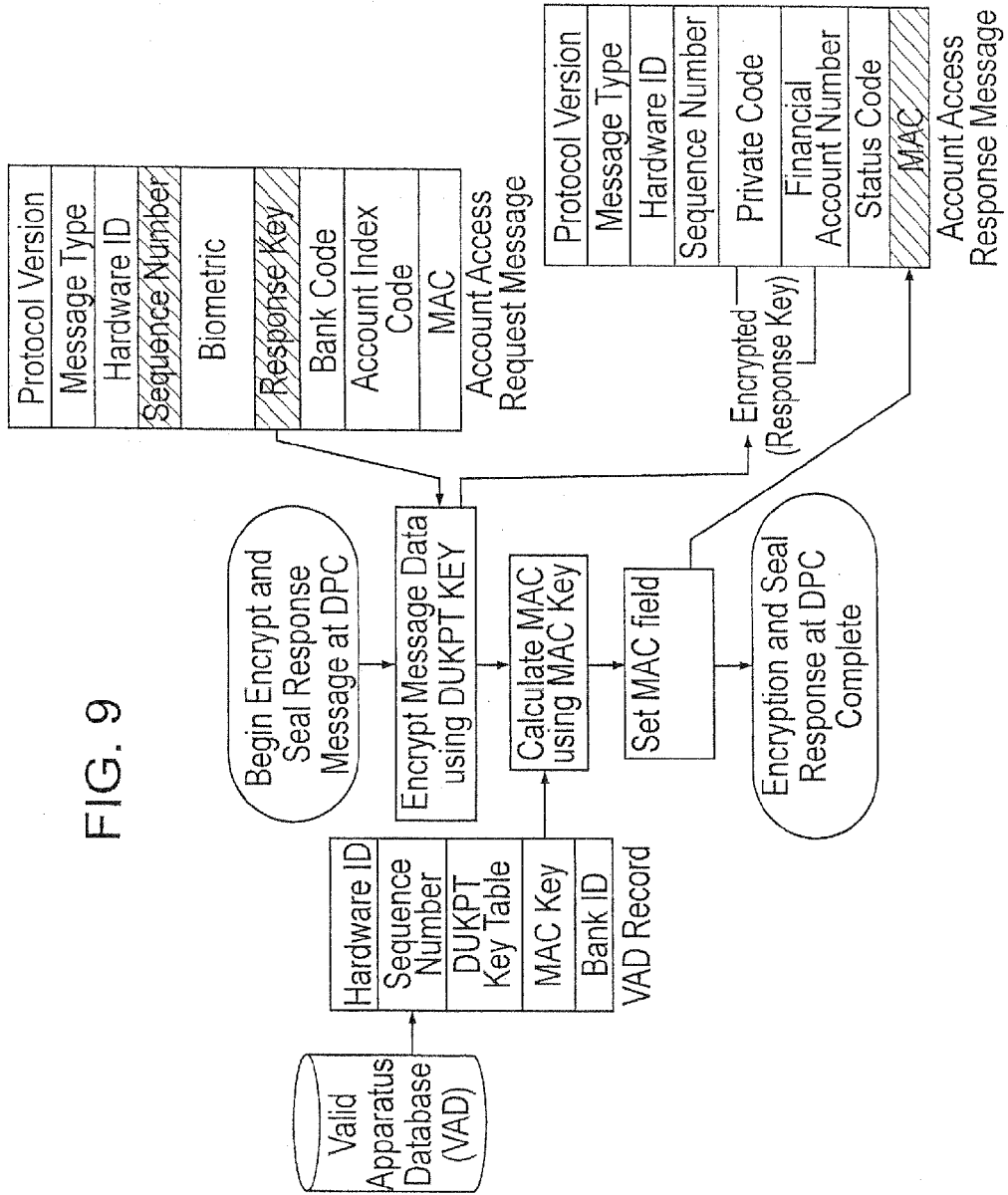
Figure 10:
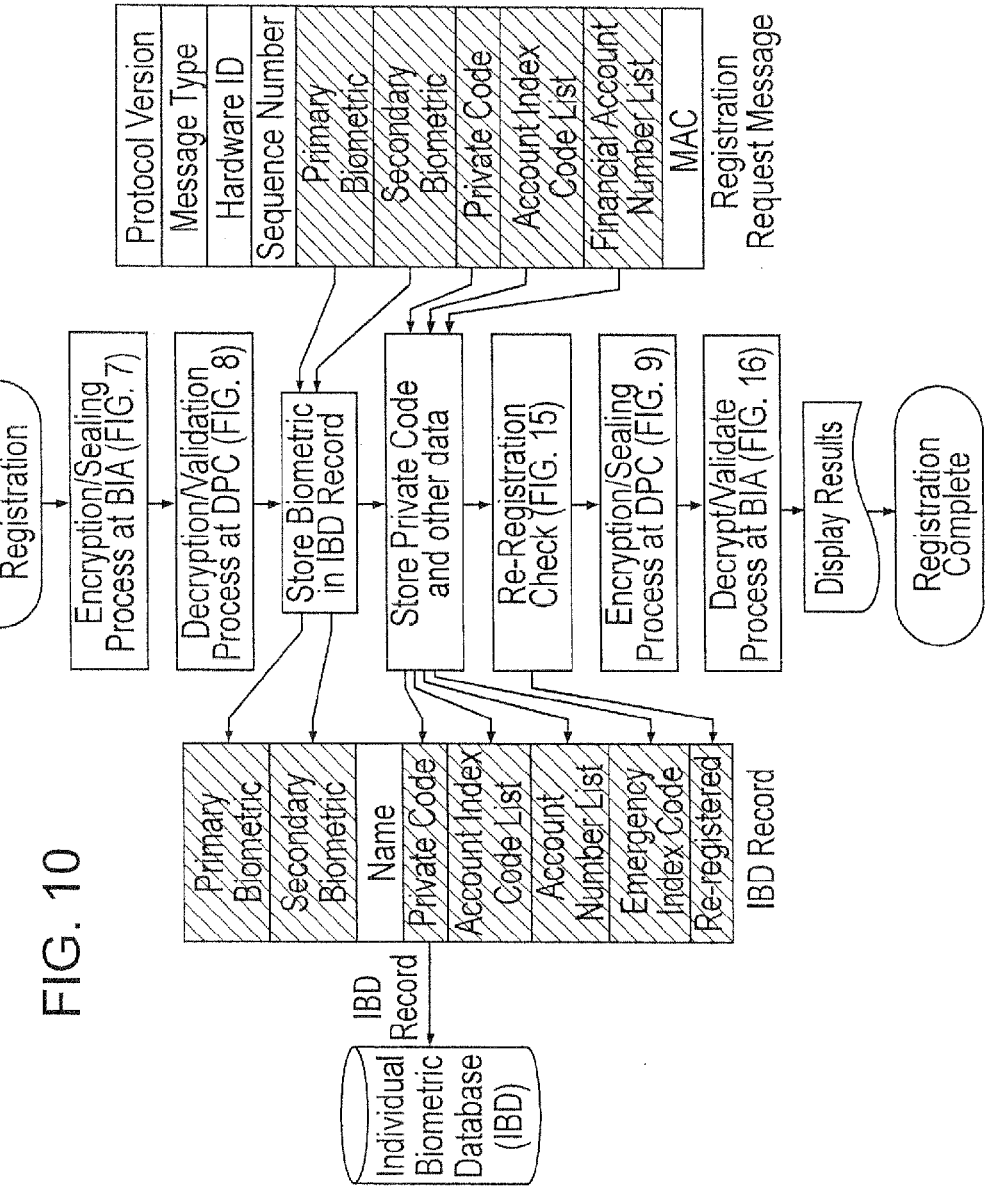
FIG. 10 shows the steps taken during the registration of a new user.
Figure 11:
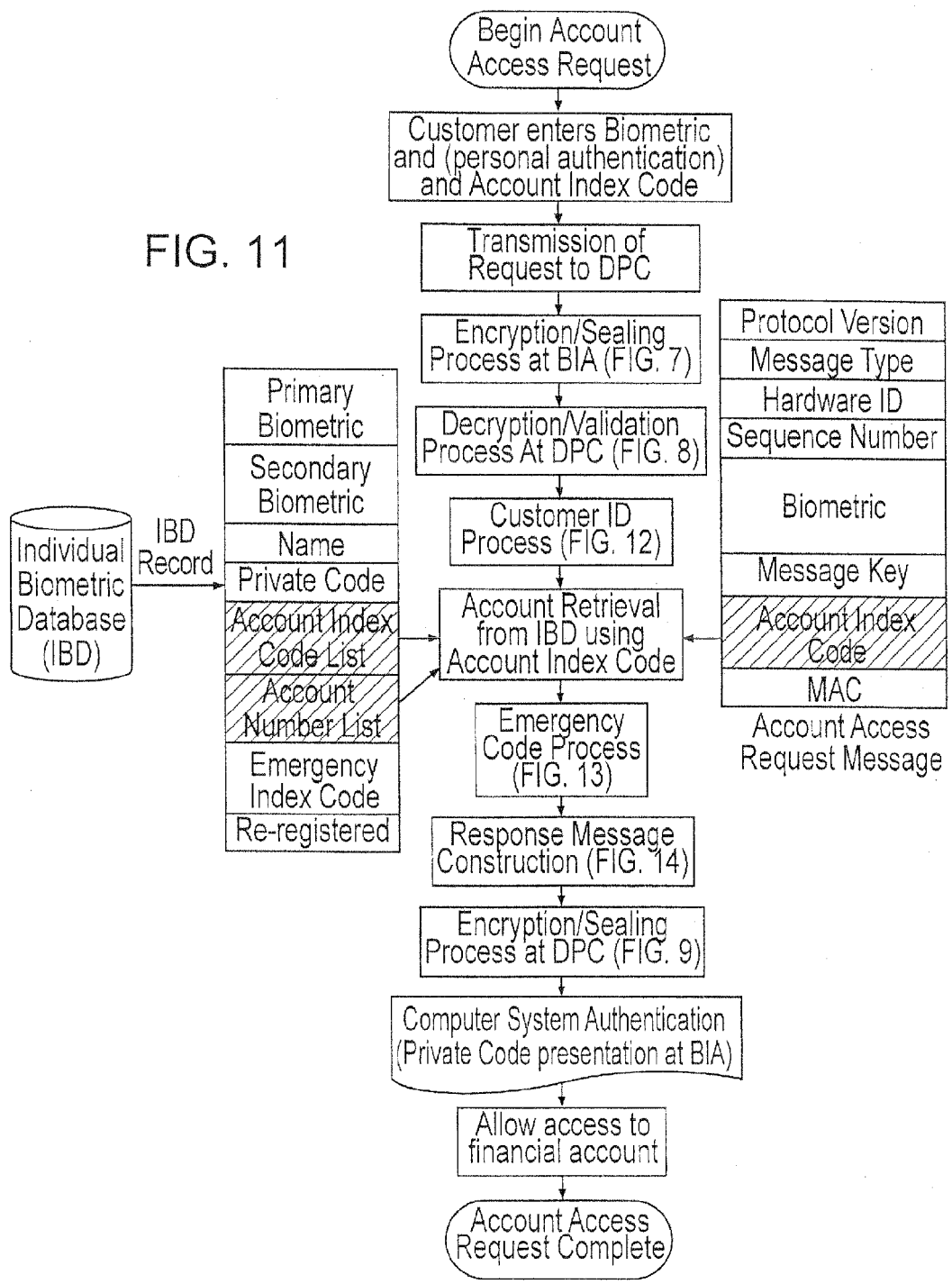
FIG. 11 describes the steps involved in processing an account access request from a user, starting from entry of biometric personal authentication information at the BIA, all processing by the DPC, and then finally the presentation of results by the BIA.
Figure 12:
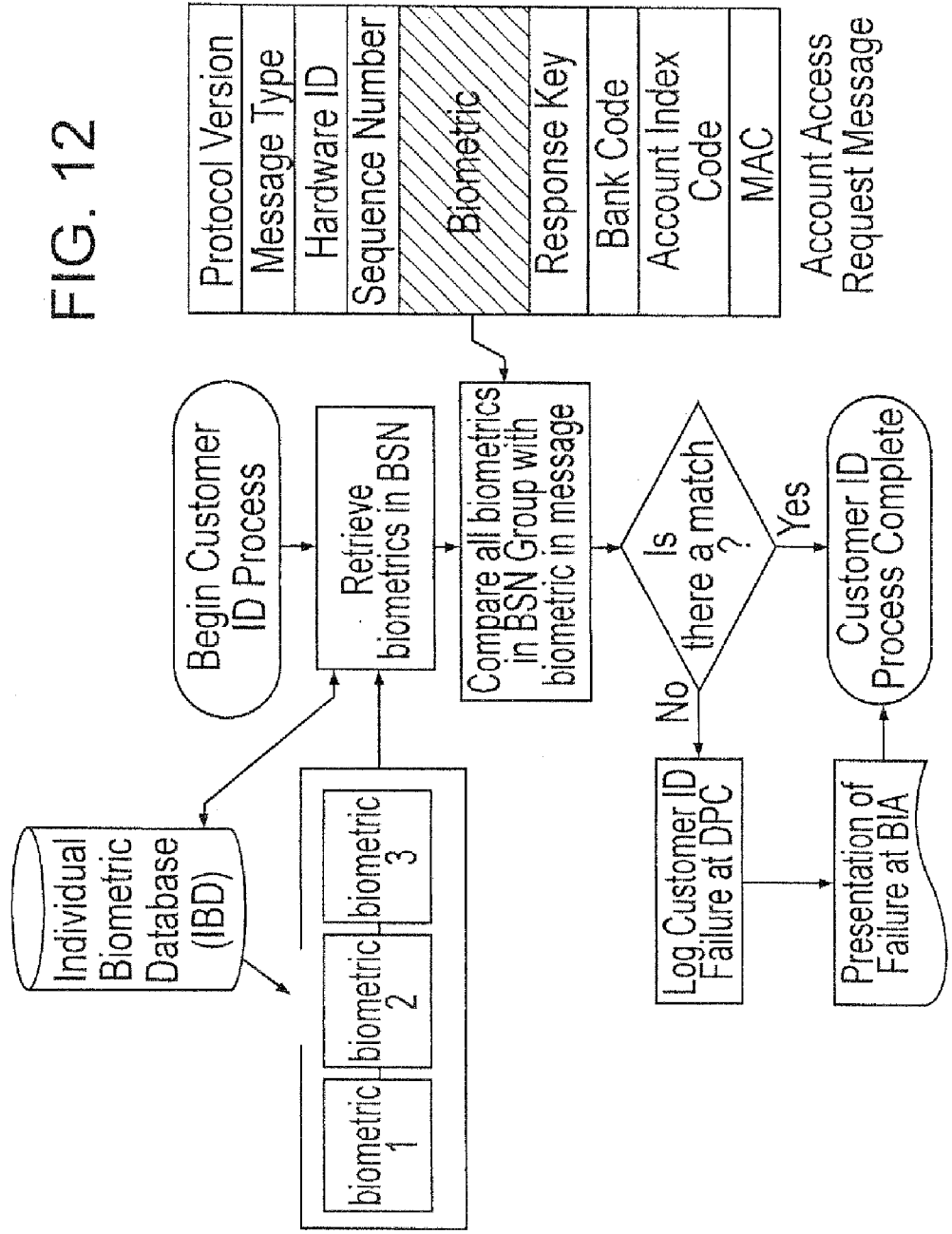
FIG. 12 describes the user ID process at the DPC.
Figure 13:
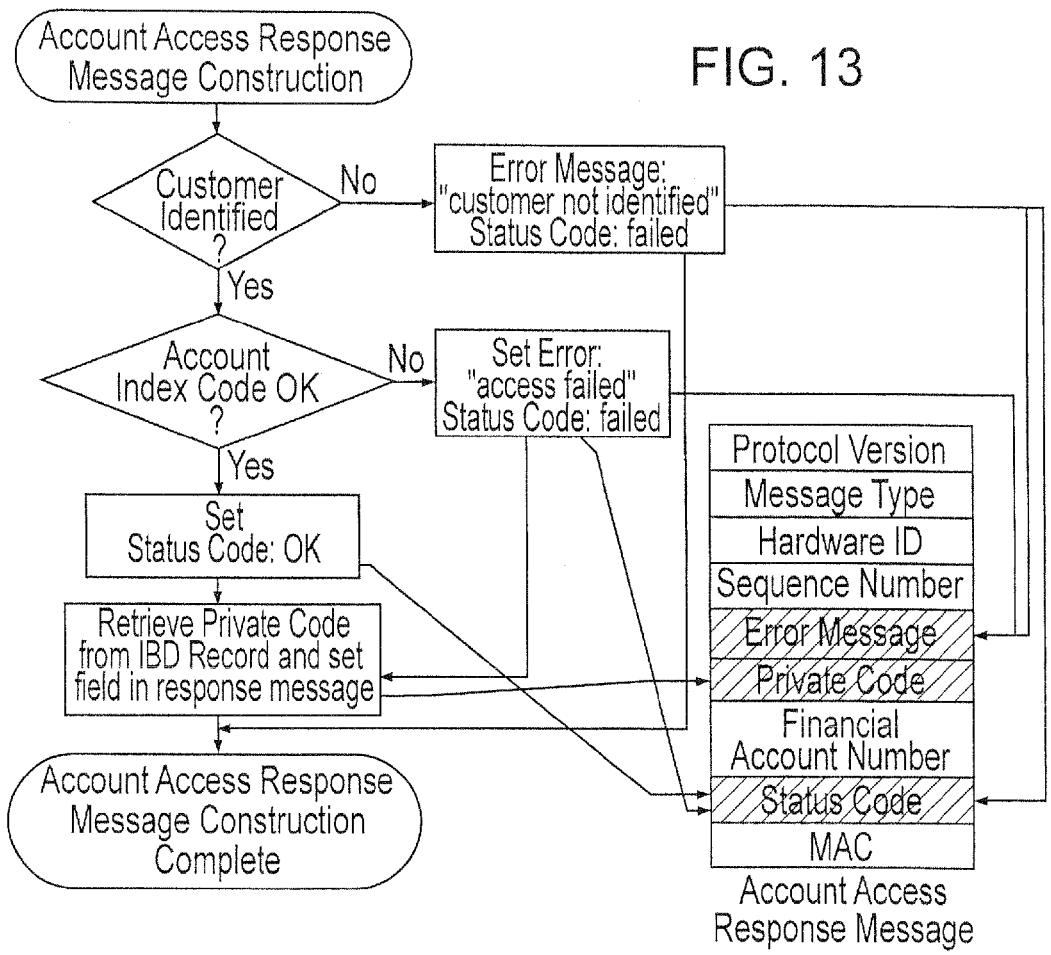
FIG. 13 shows the process for the account access response message construction.
Figure 14:
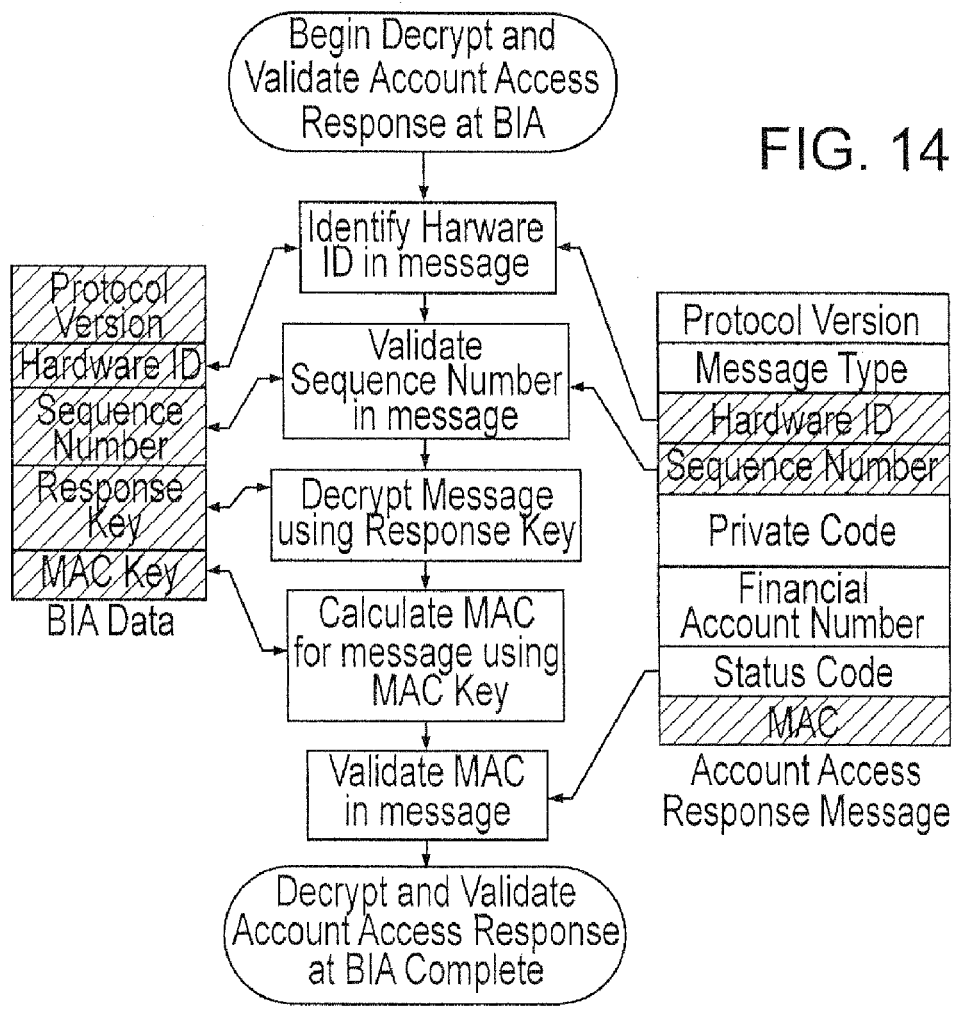
FIG. 14 shows the decryption and validation of an account access response message at the BIA.

FIG. 4b shows the process of the formation and construction of an account access request message at the BIA. FIG. 5 and FIG. 6 show a representational diagram of the account access request and response messages. Furthermore, it is shown which parts of the messages are encrypted and which ones are sealed. FIG. 7 is a block diagram of the overall process for data encryption and sealing showing the use of DUKPT key data 20 for encryption of data before appending additional data before sealing the message with a Message Authentication Code (MAC) 21. FIG. 8 and FIG. 9 show the decryption and encryption processes at the DPC. FIG. 10 shows the steps taken during the registration of a new user. FIG. 11 describes the steps involved in processing an account access request from a user, starting from entry of biometric personal authentication information at the BIA, all processing by the DPC, and then finally the presentation of results by the BIA. FIG. 12 describes the user ID process at the DPC. FIG. 13 shows the process for the account access response message construction. FIG. 14 shows the decryption and validation of an account access response message at the BIA.

Description of the drawings, diagrams, flow charts and the description of the invention, Including hardware components, software components, execution modules, databases, connection means, the data transferred between them, and the method of the invention is described in a preferred embodiment below.

Biometric Input Apparatus (BIA)

The BIA is a combination of hardware and software whose-job is to gather, encode, and encrypt biometric input for use in electronic financial transactions and providing access to financial services. Actions of the BIA are directed by an outside controlling entity called a terminal, which issues commands and receives results over the BIA's serial line.

BIA software is tailored for various BIA hardware such as: Automated Teller Machines (ATM), personal computer (or "PC"), retail, registration, internal, issuer, and integrated remote. Each software load provides a-different, use-specific command set. For instance, the registration software load does not accept requests to form retail transaction messages.

Each BIA has its unique encryption codes that are known only to the DPC, and each BIA is only allowed to perform operations limited to its designated function. Each BIA has a hardware identification code previously registered with the DPC, which makes the BIA uniquely identifiable to the DPC in each subsequent transmission from that biometric input device.

Terminals range from software applications running on personal computers to dedicated hardware/software systems developed for a particular use such as a retail point of sale. In a preferred embodiment, no BIA reveals unencrypted biometric information. Depending on the task at hand, BIA models are either partially or fully integrated with the terminal. Partially integrated devices are physically separate from the terminal, and they include wireless and standard retail point of sale BIAS. Fully integrated devices are contained within the physical enclosure of the terminal itself, for instance a telephone or an ATM. It is preferred that the BIA never disclose any secret encryption codes to any external source. Particular BIA hardware models have different configurations, as illustrated below.

BIA/Standard

The Standard BIA hardware is a multichip module combined preferably with a single-print scanner, a display screen, a serial port, and a key pad. The following components are preferably amalgamated into a multichip module, called the BIA Multichip Module (a process for encapsulating several processors in one physical shell, well known in the industry), constructed to protect the communications pathways between the devices from easy wiretapping; Serial processor, keypad processor, LCD screen processor, CCD, Scanner, A/D processor, High-speed DSP processor containing both flash and mask, ROM, General-purpose microprocessor, Standard RAM, and EEPROM.

The following software packages and data are preferably stored in mask ROM; MAC calculation library, DUKPT Key Management library, DES (with CBC) Encryption, library, Base-64 (g-bit to printable ASCII) converter library, Embedded Operating System, Serial line device driver, LCD device driver, key pad device driver, Scanner device driver, Unique hardware identification code, and Multi-Language profiles.

The following standard data and software packages are preferably stored in flash ROM. Flash ROM is more expensive, but it is much more difficult to reverse engineer, and most Importantly, it is electronically erasable. All of the more critical information is stored here. Flash ROM is used in an attempt to increase the difficulty of duplicating a BIA.

The standard data and software packages include; Unique DUKPT Future Key Table, Unique 112-bit MAC Key, DSP biometric quality determination algorithm, DSP biometric encoding algorithm, Random number generator algorithm, and Command function table.

The message sequence number, incremented each time a message is sent from the BIA, is stored in the EEPROM. EEPROM can be erased many times, but is also nonvolatile- its contents remain valid across power interruptions The following data is stored in RAM. RAM is temporary in nature, and its contents are lost whenever power is lost; Encoded Biometric Register, Account Index Code Register, Amount Register, Message Key, Response Key, 8 General Registers, and stack and heap space.

Each multichip module contains a "write-once" memory location that is irreversibly set following the initialization of the flash ROM. Whenever an attempt is made to download software to the flash ROM, this memory location is preferably checked; if it is already been set, then the BIA refuses to load.' Critical software and data keys may only be downloaded once into the device, at the time of manufacture.

All registers and keys are explicitly zeroed when an account access is canceled. Once an account access is completed, registers are cleared as well. Once a "form message" command is executed, biometric and account index code registers are also cleared, along with any encryption keys that aren't required for subsequent use. It is important that the software not keep copies of registers or keys in stack variables.

The following associated hardware components comprise the standard BIA hardware module; BIA Multichip module, CCD single-print scanner, lighted keypad with auxiliary buttons, 2-line 40-column LCD screen, RF shielding, tamper-resistant case, serial connection (up to 57.6 kb), tamper detection hardware.

All temporary storage and internal hardware and software used to calculate these values are secured, which means they resist any attempts to determine their current values, or their means of functioning.

Auxiliary buttons are used to specify particular operations, such as the list accounts operation, or the help operation, to display information that is not generally associated with an account access.

The following BIA hardware are essentially composed of the same hardware as the BIA Standard except that each contain hardware components for adapting the BIA to specialized functions.

BIA/ATM—The ATM version of BIA hardware is a multichip module combined preferably with a heavy-duty single-print scanner and a serial port.

BIA/Wireless—The Wireless version of BIA is the same as the Standard BIA, however, the serial line is replaced with a wireless communications module using external antenna. Used for example in restaurant point of sale.

BLA/PC—Remote Electronic Financial Transaction, List Accounts

BLA/Registration—User Identification, User Registration, List Accounts

BIA/Retail—Electronic Financial Transaction, List Accounts.

BIA Software

Each BIA software command set provides a different set of operations.

Preferably, the external interface to the BIA is much like a standard modem; commands are sent to it from a controlling terminal using the external serial line. When a command completes, a response code is sent from the BLA to the terminal. The particulars of the BIA software command interface detailed below illustrate one particular embodiment; other embodiments may mimic popular Key or PIN pad interfaces, such as magnetic stripe card readers.

Each BIA software load supports a different set of operations. For instance, a retail load supports only electronic financial transactions, while a registration load supports user identification and user registration.

All BIA data fields are preferably in printable ASCII, with fields separated by field separator control characters, and records separated by newlines. Encrypted fields are binary converted to 64-bit ASCII using the base-64 conversion library (all known in the industry).

If, instead of a financial account screen prompt, an account index code is used, this code can be one or more alphanumeric characters, which includes numbers, letters, and other characters. For foreign languages, this includes multiple-character combinations which are used to represent specific words or concepts in that language, such as kanji characters. When instructed, the BIA captures a biometric in the following way. A fingerprint image is captured and given a preliminary analysis by the print quality algorithm. If the image is not clearly readable by the biometric algorithm software, the BIA continues to take new scans until a predetermined number of seconds pass. As time passes and images of are taken and analyzed, messages are posted to the LCD screen and sent to the terminal based on the problems detected by the image quality algorithm. If no image of appropriate quality is forthcoming, the BIA returns an error code of time expired, displaying a message to that effect on the LCD.

Once the image quality algorithm affirms the quality of the image, the minutiae are then extracted by the image encoding algorithm, and the Biometric Sorting Number (BSN) is calculated. The BSN need not be unique to the individual, but merely serves to reduce the number of biometrics compared at the DPC. The BSN and the extracted minutia are combined to form the bid biometric.

In one embodiment, finger ridges in the image are converted into vector lines. The vector lines are typed, and features between the vector line types are compared and the image is classified according to fingerprint class. The BSN is then generated by numerically encoding the classified identification features.

The BIA software is supported by several different software libraries. Some of them are standard, generally available libraries, but some have special requirements in the context of the BIA and in the context of the particular biometric used for identification of the user.

Since the BIA is constantly selecting random DES keys for use in the message body and message response encryption, it is important that the keys selected be unpredictable keys. If the random number generator is based on time of day, or on some other externally-predictable mechanism, then the encryption keys will be much more easily guessed by an adversary that happens to know the algorithm. The security of the encryption techniques used in the BIA assumes that both the random number generator algorithm as well as the encryption algorithms are both publicly known.

One such random number algorithm for generating DES keys is defined in ANSI X9.17, appendix C.

The biometric encoding algorithm is an algorithm for locating identifying or locating the physical characteristic feature of a user of the system for example the minutiae that are formed by ridge endings and bifurcations on human fingertips. A complete list of minutiae is stored in the DPC as a reference, while only a partial list is required by the algorithm when performing a comparison between an identification candidate and a registered user.

During both registration as well as identification, the encoding algorithm must preferably find a reasonable number of minutiae points. Otherwise, the BIA will ask for the biometric to be re-entered.

The BIA is a real-time computing environment, and as such requires a real-time embedded operating system to run it. The operating system is responsible for taking interrupts from devices and scheduling tasks.

Each device driver is responsible for the interface between the operating system and the specific hardware, such as the Key pad device driver, or the CCD Scanner device driver. Hardware is the source for events such as "Key pad key pressed," or "CCD Scanner scan complete". The device driver handles such interrupts, interprets the events, and then takes action on the events.

There are any number of DES implementations publicly available. DES implementations provide a secret key-based encryption from plaintext to ciphertext, and decryption from ciphertext to plaintext, using 112-bit secret keys.

Public Key encryption support libraries are available from Public Key Partners, holders of the RSA public key patent (known in the industry). Public Key cryptosystems are asymmetric encryption systems that allow communication to take place without requiring a costly exchange of secret keys. To use a public key encryption system, a public key is used to encrypt a DES key, and then the DES key is used to encrypt a message. The BIA uses public key cryptosystems to provide for the secure exchange of secret keys.

The derived unique key per transaction key (DUKPT) management library is used to create future DES keys given an initial key and a message sequence number. Future keys are stored in a Future Key Table. Once used, a given key is cleared from the table. Initial keys are only used to generate the initial future key table. Therefore the initial key is not stored by the BIA.

The use of DUKPT is designed to create a key management mechanism that provided a different DES key for each transaction, without leaving behind the trace of the initial key. The implications of this are that even successful capture and dissection of a given future key table does not reveal messages that were previously sent, a very important goal when the effective lifetime of the information transmitted is decades. DUKPT is fully specified in ANSI X9.24.

Terminals

The terminal is the device that controls the BIA and connects to the DPC via modem, X.25 packet network, telephone network, the Internet, a private intranet, or even a Cable TV network, or some other mechanism for digital networking that is well-known in the industry. Terminals come in different shapes and sizes, and require different versions of the BIA to perform their tasks. Any electronic device that can issue commands to and receive results from the biometric input device is considered to be a terminal.

Some terminals are application programs that run on a general-purpose microcomputer, while other terminals are combinations of special-purpose hardware and software as show in FIG. 1.

Whenever a terminal provides information to the system, the system always validates it in some manner, either through presentation to the user for confirmation, or by cross-checking through other previously registered information.

While terminals are able to read some parts of BIA messages in order to validate that the data was processed properly by the BIA, terminals cannot read biometric identification information including the biometric, encryption keys, or any account index codes.

Specific BIAS export some security functionality to the terminal, such as private code display. As a result, such devices are regarded as somewhat less secure than their entirely self-contained counterparts, and as such have consequently lower security ratings.

There are many different terminal types; each is connected to a specific model BIA. Each terminal is described in brief below:

Retail Point of Sale Terminal

The RPT uses a BIA/Retail to authorize electronic financial transactions from a user to a seller. In addition to being used to accept biometric authorizations, the RPT preferably provides standard debit and credit card scanning functions as well.

Note that only the biometric-related transactions are described in detail here. It is assumed that the RPT may also consist of standard credit and debit magnetic stripe card readers, as well as optional smart card readers too. An example of a RPT is a Verifone Tranz/330.

Each RPT is connected to the DPC by a modem, an X.25 network connection, an ISDN connection, or similar mechanism. The RPT may also be connected to other devices, such as an electronic cash register, from which it obtains the amount of the transaction and the seller identification code.

The RPT consists of:
a BIA/Retail
an inexpensive microprocessor
modem or network interface hardware
seller identification code number in non-volatile RAM
a serial port for connecting to the BIA
magnetic stripe card reader (known in the industry)
ECR (electronic cash register) connection port
optional smart card reader (known in the industry)

Two entities need to be identified for the DPC to respond positively to a BIA electronic financial transaction message: the user or consumer and the seller.

The consumer is identified by the biometric, and the seller is identified by the DPC, which cross-checks the seller identification code contained in the BIA's VAD record with the seller identification code added to the transaction request by the RPT.

First, the seller enters the value of the transaction into his electronic cash register. This information is communicated to the BIA, along with the list of goods or services, date and time, any invoice numbers, the location, and the seller identification code. This represents the proposed electronic financial transaction. If the user approves, he either enters the amount or validates the amount, possibly asking for cash back, and then enters his biometric as well as his account index code. When the user completes his approval, the RPT instructs the BIA to construct the electronic financial transaction, and then sends the electronic financial transaction to the DPC through its network connection (modem, X.25, etc.).

When the DPC receives the transaction, it identifies the consumer using the biometric, obtains the account number using the screen prompt or account index code, and cross-checks the seller identification code in the message with the registered owner of the BIA. If everything checks out, the DPC forms and sends a credit/debit transaction to execute the exchange, assuming the electronic financial transaction is to happen immediately. The response from the credit/debit network is added to the private code to form the transaction response message, which the DPC then sends back to the RPT. The RPT examines the response to see whether or not the transaction succeeded, and then forwards the response to the BIA, which then displays the user's private code, concluding the transaction.

Messages between the RPT and the DPC are secured by encryption and MAC calculation from the BIA. The MAC allows the RPT to review the unencrypted parts of the message, but the RPT cannot change them. Encryption prevents the encrypted part of the message from being disclosed to the RPT.

Each retail BIA must be registered to a seller. This helps to discourage BIA theft. Furthermore, because the RPT adds the seller identification code onto each message, replacing a seller's BIA with a different BIA is detected by the cross-check performed at the DPC.

Automated Teller Machine

The purpose of the biometric ATM is to provide users access to cash and other ATM functions without having to use a debit card. It does this by submitting a biometric and an account index code and retrieving a financial account number. For users of the system, this replaces the ATM card+PIN mechanism as a method for identifying the financial account and authorizing the user. It is assumed that all ATMs still continue to accept ATM cards.

The ATM consists of:
a standard ATM
an integrated BIA/ATM (scanner only)
a connection to the DPC The biometric ATM uses an integrated BIA/ATM to identify users and allow them access to financial accounts using a biometric and an account index code. A BIA/ATM is installed into the ATM, making use of the ATM's current keypad and account index code entry. The ATM is connected to the system using its standard debit network connection. The BIA/ATM is structured in such a way as to make integration with an existing ATM network as simple as possible.

Three entities need to be identified for the DPC to respond properly to a BLA/ATM account request: the user, the bank, and the BIA/ATM.

The bank is identified by cross-checking the ATM's stored bank code with the BIA/ATM's bank code. The BIA/ATM is identified by successfully locating the BLA/ATM in the VAD, and the user is identified through the standard biometric.

To access an ATM, a user enters their biometric into the BIA along with the account index code. The BIA forms an account access request message, which is then sent to the DPC by the ATM. The DPC validates the biometric as well as the account index code, and then sends the resulting financial account number along with the private code back to the ATM. The ATM asks the BIA to decrypt the response, and then displays the private code on the ATM's display screen. In addition, the ATM also examines the response to see whether or not the user has caused a silent alarm to be raised during the account access.

Once the account number has been received by the ATM, the user performs financial operations using that and related financial accounts with the ATM, requesting cash, depositing funds, transferring funds, inquiring about account balances, and so on. Messages between the ATM and the DPC are preferably secured by encryption and MAC calculation from the BIA. The MAC means that the ATM cannot change the contents of the message without being detected, and encryption prevents the encrypted part of the message from being disclosed.

Because the BIA/ATM has no LCD or no keypad attached, it requires the ATM to provide all the text prompts and to gather all the input from the user. This is less secure than if the BIA were performing the operation, but as ATMs are quite physically robust, the resulting security is at least equivalent.

Internet Point of Sale Terminal

Internet simply repreaents a general-purpose network where a seller, the DPC, and the IPT can all connect to each other in real time. As a result, this mechanism works exactly the same on any other general-purpose network or collection of interconnected general-purpose networks.

The IPT consists of:
a BIA/PC
a microcomputer
an Internet Shopper software application
an Internet (or other network) connection In addition to identifying the user, the IPT must also identify the remote seller who is the counterparty to the transaction. The seller must also identify both the DPC and the IPT.

In one embodiment, the Internet Shopper program stores the hostname (or other form of net name) of the seller from which the purchase is taking place so that the DPC can verify the seller's identity. This is called the seller's identification channel. Since the seller registers all of his legitimate Internet hosts with the DPC, this allows the DPC to cross-check the seller identification code with the seller identification code stored under that hostname to verify the seller's identity.

First, the IPT connects to the seller using the Internet. Once a connection is established, the IPT secures it by generating and then sending a Session Key to the seller. In order to assure that the session key is protected from disclosure, it is encrypted with the seller's Public Key using Public Key Encryption. When the seller receives this encrypted Session Key, he decrypts it using his Private Key. This process is called securing a connection through a Public Key Encrypted secret key exchange.

Once connected, the IPT downloads the seller identification code, and both price and product information from the seller. Once the user is ready to make a purchase, he selects the merchandise he wishes to buy. Then, the user enters the biometric using the BIA/PC, the IPT sends the seller identification code, the product identification information, and the amount to the BIA, and instructs it to construct a Remote Electronic financial Transaction message. Then the IPT sends the request to the seller via the secure channel.

The seller is connected to the DPC via the same sort of secure connection that the IPT has with the seller, namely, using Public Key Encryption to send a secure session key.

The seller connects to the DPC, securing the connection using the session key, forwarding the transaction to the DPC for validation. The DPC validates the biometric, cross-checks the seller identification code contained in the request with the seller identification code stored under the hostname that was sent in the request, and then sends a transaction to the credit/debit network. Once the credit/debit network responds, the DPC constructs a response message including the credit/debit authorization, an encrypted private code, and the address of the user, and sends that message back to the seller.

Once the seller terminal receives the response, it copies the user's mailing address out of the response, makes note of the authorization code, and forwards the response message to the IPT.

The IPT hands the response to the BIA, which decrypts the private code and displays it on the LCD screen, indicating that the DPC recognized the user. The IPT also shows the result of the transaction as well, be it success or failure.

Since the system in general assumes that an adversary inhabiting the network can hijack network connections at any point, all parties must have secure communications during their real-time interactions. The main concern isn't disclosure of information, but rather insertion or redirection of messages.

The whole system of Public Key Encryption relies on having a trusted source for the Public Keys. These trusted sources are called Certifying Authorities, one of which is the company VeriSign, Inc.

User Registration Terminal

During the enrollment process, personal information from a user is obtained at the location of a bank, retailer, or similarly authorized institution, where that information can be validated. Each participating responsible institution has one or more BRTs that are used by employees who have been authorized to perform registrations.

The BRT consists of:
an microcomputer and screen, keyboard, mouse
a BIA/Reg
a modem or network connection
a user registration software application The BRT uses an attached BIA/Reg for biometric entry, and is connected to the system by a modem or a network connection. Preferably, User Registration Terminals are located in places that are physically secure such as retail banking outlets.

Three entities need to be identified for the DPC to respond positively to a BIA/Reg registration message: the registering employee, the registering institution, and the BIA/Reg. The employee must have been authorized to register users for that institution.

The institution and the BIA are identified by cross-checking the owner of the BIA with the institution code set by the BRT. The employee identifies himself to the system by entering his biometric upon starting the registration application.

The institution uses its standard user identification procedure (signature cards, employee records, personal information, etc.) before registering the user on the system. It is important for the institution to verify user identity as assiduously as possible, since the registering user will be empowered to make purchases and transfer money from those financial accounts at will.

During registration, the user preferably enters both a primary and a secondary registration biometric sample. The user must use both index fingers; if the user is missing index fingers, the next inner-most finger may be used. Requiring specific fingers to be used (such as the index finger) allows the prior fraud check to work.

The user is encouraged to select a primary and a secondary finger; the primary finger is given preference during the DPC identity check, so the user should present the most-often used finger as the primary. Alternatively, the DPC chooses to alter the designation of primary and secondary biometrics.

As a part of the biometric encoding process, the BIA/R determines if the user has entered "a print of sufficient clarity to be read by the biometric algorithm." If a good print is not present, the BIA/R asks the user to re-enter the biometric which was determined to be of poor quality.

The user's registration biometric sample is then compared to other registration biometrics contained within the database having the same BSN, and if a match is found, the registration may be denied on the basis of a duplicate registration.

In another embodiment, the user constructs a confidential private code consisting of a word or phrase. If the user does not wish to construct one, a private code may be constructed randomly by the terminal.

In yet another embodiment, the user arranges a financial account code list. This list describes which account index code points at which account (e.g. 1 for debit, 2 for credit, 3 for emergency account index code linked to debit, etc.). For checking and savings accounts, the registering institution must be the bank or financial institution that provides the accounts.

In another embodiment, a user is not actually able to perform operations using the system until a prior fraud user re-registration check is completed. Only if the system finds no instance of prior fraud is the user's access activated.

In an alternate embodiment, registrations are accomplished at places such as supermarkets, over the Internet, or at unattended kiosks. The ability to authorize transactions will only be enabled once registration is confirmed.

The employees performing the registration operation may be required to identify themselves using biometric only when initially activating the registration system. This is a convenience for the employee, but a possible security problem for the system, as unattended or "temporarily borrowed" BRTs could be the source for fraud. As a result, the registration application exits after a predetermined period of no activity.

Phone Point of Sale Terminal

The PPT consists of:
a BIA/catv
a VoiceView-equipped rapid—connect digital modem
a telephone (keypad, earpiece, microphone)
a microprocessor
a DSP (digital signal processor)
a standard telephone line The PPT accepts biometric identification using a BIA/Catv connected to and integrated with a cordless, cellular, or standard telephone.

In order for the DPC to authorize a transaction, both the user and the seller must be identified.

To identify a user, biometric identification is used.

To identify a phone-order seller, the seller and all his phone numbers that users will call are registered with the DPC. Thus when a user submits an authorization, he also submits the phone number he called, which is then cross-checked with the seller's listed phone numbers.

Users call sellers that are selling their wares through paper catalogs, newspapers, magazines, or other basic print media mechanisms. The PPT uses a special modem that shares the telephone voice line to exchange digital information with the seller.

Each time the user makes a phone call, the PPT keeps track of the phone number that was typed by the user, in case the user decides to make a purchase. A DSP is used to detect dialtone, ring, connection, and so on, in order to tell what the actual phone number entered was, as distinct from extensions, or the navigation of phone message systems, and so on.

Once a call is placed to a seller, the salesman for the seller digitally downloads all the relevant information to the PPT including product, price, and the seller identification code. Note that when in operation, the modem disconnects the speaker.

When the product information is downloaded, the PPT then prompts the user for the biometric, the account selection (using either a screen prompt or an account index code), and then asks the user to validate the purchase amount. Then the phone number and the seller identification code are added, and the message is encrypted. The rapid-connect modem is again engaged to send the authorization information to the seller.

When the seller receives the authorization information, the seller verifies that the price and product information are correct, and then forwards the transaction to the DPC using a secured communications channel using either the Internet or some other general-purpose network. The connection to the DPC is secured using Public Key Encryption and a secret key exchange.

Upon receiving and decrypting a phone authorization, the DPC checks the phone number against the seller identification code, validates the biometric, and then sends the transaction to the credit/debit network for authorization. If authorization succeeds, the DPC appends the user's address to the response message and sends the response to the seller.

The seller receives the response from the DPC, copies the mailing address, and forwards the message to the user again via a brief session with the rapid-connect modem. When the transmission to the IPT is complete, a chime sounds, the modem disconnects, and the user's private code (decrypted by the BIA) is displayed on the LCD screen. The seller's sales rep confirms that the user's mailing address is valid; if so, the call is terminated and the transaction is complete.

Data Processing Center

The Data Processing Center (DPC) handles user registration, seller registration, user identification, seller identification, and in some cases, electronic financial transactions as its main responsibilities.

Preferably, each DPC site is made up of a number of computers and databases connected together over a LAN as illustrated in the DPC Overview FIG. 2. Multiple identical DPC sites ensure reliable service in the face of disaster or serious hardware failure at any single DPC site. Furthermore, each DPC site has electrical power backup and multiple redundancy in all of its critical hardware and database systems.

DPC components fall into three categories: hardware, software, and databases. Below is a short description, by category, of each component.

Hardware

Firewall Machine: the entry point of the DPC site. FW

Gateway Machine: the system coordinator and message processor. GM

DPC Local Area Network: connects the DPC sites. DPCLAN

Databases

Individual Biometric Database: identifies users either from their biometric and a BSN. IBD Valid Apparatus Database: stores information required to validate and decrypt BIA messages. VAD Apparatus Owner Database: stores information about the owners of BIA devices. AOD Authorized Individual Database: stores the list of people allowed to use personal or issuer BIA devices. AID Remote Seller Database: stores information necessary to process transactions with telephone and cable television sellers. RSD Software Message Processing Module: handles the processing of each message by coordinating with the other software modules and databases required to perform the message's task. MPM Sequence Number Module: handles DUKPT sequence number processing. SNM Message Authentication Code Module: handles MAC validation and generation. MACM Message Decrypt Module: handles encrypting and decrypting of BIA requests and responses. MDM IBD Machine List: handles the lookup of the main and backup database machines dedicated to holding IBD records for a given biometric group. IML When defining database schema, the following terminology is used for describing field types:

| | |
|---|---|
| int<X> | an integral type using <X> bytes of storage |
| char<X> | a character array of <X> bytes |
| text | a variable length character array |
| <type>[X] | a length <X> array of the specified type. |

-continued

| | |
|---|---|
| time | a type used for storing time and date |
| biometric | a binary data type used for storing the biometric |

When describing database storage requirements, the term "expected" means the expected condition of a fully loaded system.

Terminals accomplish their tasks by sending messages to a DPC site. The DPC site sends back a response packet containing the status on the success or failure of the operation.

Communication is via a logical or a physical connection-oriented message delivery mechanism such as X.2.5 connections, TCP/IP connections, or a telephone call to a modem bank. Each session holds the connection to the terminal open until the DPC sends its response back to the terminal.

The message contains a BIA message part and a terminal message part:

BIA message part consists of:
protocol version number
message type
4-byte BIA Identification (hardware ID)
4-byte sequence number
<message specific data>
Message Authentication Code (MAC)
Terminal message part
<terminal specific data>

The BIA message part is constructed by a BIA device. It includes one or two biometrics, authorization amounts, and the contents of the general registers which are set by the terminal. Note: the MAC in the BIA message part only applies to the BIA part and not to the terminal part.

A terminal may place additional data for the message in the terminal message part. The BIA provides a message key to allow the terminal to secure the terminal part data. The BIA automatically includes the message key in the packet's encrypted biometric block when necessary. The terminal performs the message key encryption itself, however.

The response packet contains a standard header and two optional free-form message parts: one with a MAC and one without:

Standard Header
protocol version number
message type
4-byte hardware ID
4-byte sequence No.
<message specific data>
MAC
Optional Free-form message part without MAC
<additional message specific data>

The message part with a MAC is sent to the BIA so that it may validate that this part of the response has not been tampered with and to display the user's private code. The message part without a MAC is used for transmitting large amounts of data that are not sent to the BIA for MAC validation as the BIA to terminal connection may be of limited bandwidth.

In an embodiment of the invention with multiple DPC sites, a terminal need only send its message to one of the DPC sites, typically the closest, because that site automatically handles updating the others by running distributed transactions as necessary.

When one of the DPC's Firewall Machines receives a packet, it forwards it to one of the GM Machines for the actual processing. Each GM has a Message Processing Module that handles the coordination between the DPC components required to process the message and sends the response back to the sender.

All packets the PPC receives, with the exception of those not constructed by a BIA, contain a BIA hardware identification code (the BIA Identification of the packet), a sequence number, and a Message Authentication Code (MAC). The GM asks the MAC Module to validate the packet's MAC and then checks the sequence number with the Sequence Number Module. If both check out, the GM passes the packet to the Message Decrypt Module for decryption. If any one of the checks fail, the GM logs a warning, terminates processing for the packet, and returns an error message to the BIA device. Each packet the DPC receives may contain an optional response key stored in the encrypted biometric block of the packet. Before the DPC replies to a message that includes a response key, it encrypts the response packet with the response key. It also generates a Message Authentication Code and appends it to the packet.

The only exception to encrypting response packets applies to error messages. Errors are never encrypted and never include confidential information. However, most response packets include a status or response code that can indicate whether the request succeeded or not. For example, when the DPC declines a credit authorization, it does not return an error packet, it returns a normal transaction response packet with a response code set to "failed".

DPC Procedures

The DPC has three procedures commonly used while processing messages.

For messages that require the DPC to identify a user, the DPC executes the following procedure. Using the BSN from the bid biometric, the DPC searches the IBD Machine List for the main and backup IBD machines responsible for handling identifications for the given BSN code. Next, the DPC sends the identification message to either the main or backup machines depending on which is the least loaded. The IBD machine responds with the IBD record for the user or a "user not found" error.

The IBD machine retrieves all the IBD records for the given BSN. The IBD machine compares each record's primary registered biometric sample with the user's bid biometric sample arriving at a comparison score indicating the similarity of the two biometrics. If no biometric has a close enough comparison score, the comparisons are repeated using the registered secondary biometric samples. If none of the secondary biometric have a close enough comparison score, then the IBD machine returns an "user not found" error. Otherwise, the IBD machine returns the full IBD record of the user, from which such fields such as the private code, financial account numbers, and so on may be obtained.

Each entry in the VAD preferably has information on the number of recent messages submitted, the number of recent messages that have failed, the device security assessment, whether or not the device is attended along with the fraud detection skill of the attendant, and lastly the security problems associated with the physical location of the device itself.

Whenever a user identification fails, the VAD record for the device is updated appropriately. Too many failures, and the Security Factor Module will take the device out of service, refusing any further transactions from that device until a service representative places it back in service.

Protocol Messages

The following sections describe each protocol message/response and the actions the DPC takes to perform them.

The list of protocol packets are:
User Registration
User Identification
Electronic Financial Transaction
ATM Access
List Accounts User Registration
Registration Request
BIA Part:
protocol version message type
4-byte hardware ID
4-byte sequence number
encrypted (DUKPT key) Biometric:
   1000-byte primary registration biometric
   1000-byte secondary registration biometric
   112-bit response key
   112-bit message key
MAC
Terminal Part:
encrypted (message key):
   name
   address
   zip code
   private code
   financial account list (account index code, financial account #)
   account index code
Registration Response
protocol version
message type
4-byte hardware ID
4-byte sequence number
encrypted (response key):
private code text
biometric identification code
list of DPC chosen BSNs
status code (OK, fail, etc.)
MAC Users register with the DPC via a User Registration Terminal (URT). The URT sends the DPC a registration packet containing primary and secondary biometrics, along with ancillary data such as the user's name, address, a list of financial accounts, the private code, and the emergency account index code. Optionally, the user may include a Social Security Number (or "SSN"). In a modification step any previously entered data can be modified or deleted.

At any given moment, only one DPC site acts as the registration site, for implementation simplicity. Registration request packets received by non-registration DPC sites are forwarded to the current registration site. The registration DPC site performs the entire registration check, assigning of IBD records to IBD machines, and the distributed transaction required to update all other DPC sites.

The registration DPC site selects the BSN code for the registration biometric, stores the IBD record on the main and backup IBD machines (as specified in the BSN List), and checks the biometric suitability of the registration packet before running the distributed transaction to update the other DPC sites.

The DPC runs a BSN and biometric sample duplication check step wherein the biometric and BSN from the registration step is checked against all previously registered biometrics currently associated with the identical BSN. The DPC may reject the registration for the following reasons: the biometrics are confusingly similar to another biometric, thereby generating a BSN that is already assigned. Alternatively, the biometrics may be too similar to other biometrics stored under the BIV chosen by the computer system, resulting in an unacceptable false accept rate or false reject rate.

User Identification
User Identification Message
BIA Part:
4-byte BIA Identification
4-byte sequence number
encrypted (DUKPT key) Biometric block:
   300-byte authorization biometric
   112-bit response key
MAC
Terminal Part: (not used)
User Identification Response
Encrypted (response key):
private code text
user name
status code (ok, failed, etc.)
MAC The User Identification message includes a biometric block which the DPC uses with the user identification procedure to identify the user. If the user is identified, then the DPC responds with the user's name, biometric identification, and private code. Otherwise, the DPC responds with an "unknown user" error.

Electronic Financial Transaction
Electronic Financial Transaction Message
BIA Part:
4-byte BIA Identification
4-byte sequence number
encrypted (DUKPT key) Biometric block:
   300-byte authorization biometric
   112-bit response key
   [optional 112-bit message key]
account index code
price
seller identification code
transaction type
[optional free-format product information]
[optional seller identification channel (phone number, channel number+time, hostname)]
[optional send-address request]
MAC
Terminal Part: (not used)
Electronic Financial Transaction Response
Encrypted (response key):
private code text
authorization response
authorization detail (authorization code, transaction identification, etc)
[optional user address information]
status code (OK or fail, silent alarm)
MAC There are two basic electronic financial transaction sub-types: retail and remote.

There are two basic transaction types: debit and draft. Drafts return authorizations that are subsequently cashed by the seller. No money changes hands until the draft is cashed. Most current credit card transactions are done via draft. For instance, a deposit charge placed on a credit card by a car rental agency is done using a draft. In one embodiment, these steps are accomplished using a pair of ISO 8583 messages: an authorization message followed by a financial transaction message.

Debit transactions result in immediate transfer of money from the user's financial account to the seller's financial account. Note that debit transactions can occur on a number of different kinds of financial accounts, including checking accounts, savings accounts, money market accounts, credit accounts, and even phone calling-card accounts. If money changes hands immediately, the system considers the transaction type to be debit, regardless of the financial account type used as the source of funds, or which external computer system is used to move the money around. The DPC identifies the user by the biometric block of the message. If the user cannot be identified, the DPC replies with an "unknown user" error. At this point, the DPC executes the actual transaction.

For instance, if the transaction type is a draft, the DPC constructs a credit authorization draft request and transmits it to the appropriate external computer system (e.g. VISA-Net, MAPP, etc.). The external computer system is responsible, in this embodiment, for performing the resource determination to see if the user can pay. If the external computer system approves the transaction, the DPC returns an "OK" response code to the BIA device, while a disapproval results in a "failed" code. The contents of the response message from the external computer system (called an "authorization request response", see ISO 8583) are added to the response as well along with the user's private code.

In an alternate embodiment, the accounts and their balances are stored at the DPC, which performs resource determination, draft generation or credit/debit instead of sending the transaction to an external computer system. Access request allows BIA-equipped terminals to provide a safer and more convenient way for users to identify themselves to the ATM.

Remote authorization are generated by telephone, mail order, the Internet, or cable television sellers. The DPC handles remote authorizations the same way it does a retail authorization but with the following exceptions:

i) Remote authorizations include a remote seller identification code which the DPC checks against the Remote Seller Database to validate whether the packet's seller Identification matches the one stored in the database. Furthermore, the financial account credited is the remote seller's financial account, not the financial account of the BIA device's owner.

ii) Additionally, BIA devices that generate the remote authorizations tend to be personal BIA devices. The DPC checks the biometric Identification of the identified user against the Authorized Individual Database's list of users allowed to use the BIA device. If the user is not authorized to use the device, then the DPC denies the authorization request.

iii) Finally, the authorization packet may contain a "send-address" indicator. This indicator informs the DPC to include the user's address in the response packet and is usually used only for mail order purchases.

List Accounts
List Accounts Message
BIA Part:
4-byte BIA Identification
4-byte sequence number
encrypted (DUKPT key) Biometric block
   300-byte authorization biometric
   112-bit response key
MAC
Terminal Part: (not used)
List Accounts Response
encrypted (response key):
private code text
list of (account name, account index code)
status code (OK, failed, etc.)
MAC The list accounts message allows users to determine which financial accounts match particular account index codes. This is useful when users forget which financial accounts and index codes are available.

The GM identifies the user by the packet's biometric and retrieves the appropriate information from the user's record. During registration, the emergency account index code will be given an innocuous-sounding name so that criminals cannot determine which account index code will trigger the emergency notification.

User Support and System Administration Messages

The DPC handles additional message types classified as internal messages. The DPC generally does not accept these messages from non-DPC systems. The messages are database vendor specific. However, the internal network uses DES-encrypted packets to provide additional security.

The User Service and System Administration tasks are implemented using the database vendor's query language and application development tools.

User Service Tasks
IBD: find, activate, deactivate, remove, correct records, change BSN.
AID: add or remove authorized individuals.
AOD: find, add, remove, correct records.
VAD: find, activate, deactivate: remove, correct records.
RSD: find, add, remove, correct records.
PFD: add, remove, correct records.
System Administration Tasks
Run prior fraud checks.
Modify the Valid Site List.
Summarize log information (warnings, errors, etc.).
Performance monitoring.
Run backups.
Crash recovery procedures.
Time synchronization for the DPC sites.
Change the primary registration site.
Change the secret DES encryption key.
Generate a list of BIA hardware identification code, MAC encryption key, and DUKPT Base Key triples. Store on an encrypted floppy for the Key Loading Device.
DPC LAN The DPC Local Area Network (LAN) links the machines of the DPC sites together preferably using a fiber optic token ring. The fiber optic token ring provides both high bandwidth and good physical security.

The network interfaces used by the machines on the DPC LAN include encryption hardware to make tapping or intercepting packets useless without the encryption key. The encryption key is the same for all machines on the LAN and is stored in the encryption hardware.

A properly configured network sniffer acts as an intruder detector as backup for the FW. If an anomalous message is detected, the intruding messages are recorded in their entirety, an operator is alerted, and the FW is physically shut down by the sniffer.

Message Processing Module

The Message Processing Module (MPM) handles the processing for a message. It communicates with other components of the DPC as necessary to perform its tasks. The presence of an MPM on a machine brands it as a GM.

The MPM maintains a message context for each message it is currently processing. The message context includes the information necessary to maintain the network connection to the terminal making the message, the BIA device information, the response key, and the response packet.

Message Authentication Code Module

The Message Authentication Code Module's (MACM) tasks are to validate the Message Authentication Code on inbound packets and to add a Message Authentication Code to outbound packets.

The MACM maintains an in-memory hash table of 112-bit MAC encryption keys keyed by BIA hardware identification code.

When the MACM receives a request from the GM to validate a packet's MAC, it first looks up the packet's hardware identification code in the hash table. If no entry exists, then the MACM replies to the GM with an "invalid hardware identification code" error Otherwise, the MACM performs a MAC check on the BIA message part of the packet using the 112-bit MAC encryption key, If the MAC check fails, then the MACM replies to the GM with an "invalid MAC" error. Otherwise, the MACM replies with a "valid MAC" message.

If the packet contains a seller identification code, the MACM also checks the seller Identification code against the owner identification code in the hash table. If the codes don't match, then the MACM replies with an "invalid owner" error.

When the MACM receives a request from the GM to generate a MAC for a packet, it looks up the MAC encryption key using the packet's hardware identification code. With the MAC encryption key, the MACM generates a MAC and adds it to the packet. If the MACM cannot find the hardware identification code in its hash table, it replies with an Invalid hardware identification code error instead.

Database Schema
The MACM hash table entry contains:
MACM Entry:
hardwareId=int4
ownerId=int4
macEncryptionKey=int 16
The table is hashed by hardware identification code.

Assuming 5 million BIA-equipped devices in service, the hash table requires about 120 MB of storage. For performance reasons, this hash table is cached completely in memory.

The MACM only contains records referencing active BIA hardware identification codes and active apparatus owners. Whenever an apparatus or apparatus owner is suspended or deleted from the system, the MACM removes any entries that reference the identification code. When an apparatus is activated, the MACM then adds an entry for it.

The MACM also caches the MAC encryption key from the Valid Apparatus Database. Since the system does not allow the encryption key of a BIA to be changed, the MACM does not need to worry about receiving encryption key updates.

Message Decrypt Module

The Message Decrypt Module's (MDM) task is to reconstruct the DUKPT transaction key and with it decrypt the biometric block of the packet. It maintains a list of the DUKPT Base Keys that are required to generate the transaction key.

The MDM constructs the DUKPT transaction key using the packet's sequence number as the DUKPT transaction counter, the upper 22 bits of the BIA hardware identification code as the DUKPT tamper resistant security module (or "TRSM") Identification, and the low 10 bits of the BIA hardware identification code as the DUKPT Key Set Identification.

The DUKPT standard specifies how the transaction key is generated. The Key Set Identification is used to look up a Base Key from the Base Key List. The Base Key is used to transform the TRSM Identification into the initial key via a DES encrypt/decrypt/encrypt cycle. The transaction counter is then applied to the initial key as a series of DES encrypt/decrypt/encrypt cycles to generate the transaction key.

For additional security, two Base Key Lists are maintained, one for low security BIA devices and one for high security devices. The MDM chooses which Base Key List to use depending on the security level of the device.

Database Schema
The MDM Base Key List entry contains:
MDM Entry:
baseKey=int 16
The Base Key List is indexed by Key Set Identification.

The MDM maintains an in-memory list of the DUKPT Base Keys. Each key requires 112-bits. The MDM maintains two sets of 1024 keys requiring 32 KB total.

Biometric Group List (BSN Group List)** Check This

The Biometric Group List (BGL), in conjunction with the Individual Biometric Database Machine List, defines the configuration of the IBD machines. The BGL stores a list of the BSNs in the system which is used to simplify the management of the biometrics. A BSN is a set of consecutive biometric values. A BGL exists on each GM Machine (GM).

The BGL, when given a BSN, searches through its list of biometric groups for the group containing the BSN. The BGL maintains the list of groups in order and uses a binary search to quickly find the correct group.

The initial configuration for the BGL is one giant biometric group containing all possible biometrics. After a threshold number of BSNs are assigned, the giant biometric group is split in two. Thereafter, this process is applied to all succeeding biometric groups.

When a biometric group splits, the BGL assigns a new main and backup IBD machine based on available storage on a first-come-first serve basis. The BGL coordinates with the IBD machines to first copy the affected records from the old main and backup machines to the new ones, update the IML record, and last remove the old main and backup copies. Splitting a biometric group is an involved task. The BGL batches split requests to be run when the DPC is lightly loaded, for instance, at night.

The system administrator may also change the main and backup IBD machines for a given biometric group if the machines' free storage falls below a level required for handling the expected amount of new registrations.

Database Schema
The schema for the Biometric Group records are:
BiometricGroup:
lowBgv=int8
highBgv=int8
used=int4
Each biometric group is identified by a unique identifier. For convenience the biometric group identification code is the lowBgv code for the group, however the system does not otherwise rely upon this fact.

The BGL is keyed by the lowBgv field.

The BGL is expected to contain about 3000 groups (each biometric group contains about 1000 active biometric values, but may span millions of actual biometric values). The entire BGL requires about 72 KB of storage and is cached completely in memory.

When biometric groups are added, merged, or split up, the BGL is responsible for informing the IBD Machine List of the changes and for directing the movement of IBD records from one IBD machine to another.

Individual Biometric Database Machine List

The IBD Machine List (IML), in conjunction with the Biometric Group List, codifies the configuration of the IBD machines. The IML maps a biometric value to the main and backup IBD machines storing IBD records for the biometric. The IML is actually keyed by Biometric Group (a set of consecutive biometric values). An IML exists on each GM Machine (GM).

When a GM processes a message that requires a biometric identification, the GM finds the IML record keyed by the biometric group. The GM then knows the main and backup IBD machines to use for the biometric identification.

Most IBD records will be users, who will use the system to purchase products from sellers at points of sale. The rest of the records will be generally associated with people who perform administrative functions such as registration, or user support.

Database Schema

The schema for the IML list entries are:

MachinePair:
biometricGroup=int8
main=int2,
backup=int2

The IML is keyed by bvgGroup.

The IML is expected to contain about 3000 entries (the number of Biometric Value Groups). Each MachinePair record is 12 bytes requiring about 36 KB of storage and is cached completely in memory.

Any changes in the configuration of the IBD machines are reflected in the IML. In addition, the IML uses Biometric groups for its keys so when the Biometric Group List gets modified, the IML is also updated.

Sequence Number Module

The Sequence Number Module's (SNM) primary function is to prevent replay attacks by validating packet sequence numbers. Its secondary task is to minimize the effects of a resubmission attack by informing other SNMs in remote DPC sites of sequence number updates and to periodically update the sequence numbers in the Valid Apparatus Database.

The SNM maintains an in-memory hash table of sequence numbers keyed by BIA hardware identification code codes to allow quick validation of packet sequence numbers.

When the SNM receives a validate request from the GM for a given hardware identification code and sequence number, it looks up the hardware identification code in the hash table. If no entry exists, then the SNM replies to the GM with an "invalid hardware identification code" error.

Otherwise, the SNM checks the given sequence number against the sequence number stored in the hash table entry. If the sequence number is less than or equal to the stored sequence number, the SNM replies with an "invalid sequence number" error. Otherwise, the SNM sets the sequence number in the hash table entry to the given sequence number and replies with a "valid sequence number" message.

From time to time, the SNM may observe a sequence number gap. A sequence number gap occurs when the SNM receives a sequence number that is more than one greater than the sequence number stored in the hash table entry. In other words, a sequence number was skipped. When the SNM discovers a sequence number gap, it replies with a "sequence number gap" message to the GM instead of a "valid sequence number" message. The GM treats the packet as valid, but it also logs a "sequence number gap" warning.

Sequence number gaps usually occur when network connectivity is lost: packets are dropped or can't be sent until the network is restored to working order. However, sequence number gaps occur for fraudulent reasons as well: malicious parties could intercept packets preventing them from arriving at the DPC or they could even attempt to counterfeit packets (with a large sequence number so that it isn't immediately rejected).

The SNM's secondary function is to inform other DPCs of the updated sequence numbers. Quickly updating sequence numbers at all DPC sites thwarts resubmission attacks wherein a malicious entity monitors packets destined for one DPC site and immediately sends a copy to a different DPC site in the hope of exploiting the transmission delay of sequence number updates from one DPC site to another resulting in both sites accepting the packet as valid, when only the first site should accept the packet.

The SNMs send update messages to each other whenever they receive a valid sequence number. If an SNM receives an update message for a sequence number that is less than or equal to the sequence number currently stored in its hash table, that SNM logs a sequence number resubmission warning. All resubmission attacks are detected in this manner.

A simpler way to thwart resubmission attacks completely, is to have only one SNM validate packets. Under this scheme, there is no update transmission delay window to exploit with a resubmission attack. Alternately, multiple SNMs can be active at the same time provided none of them handle sequence number validation for the same BIA-equipped device.

Sequence Number Maintenance

When the SNM boots up, it loads the sequence number hash table from the sequence numbers for active BIA stored in the VAD.

The VAD is responsible for sending add-entry and remove-entry messages to the SNMs for any BIA-equipped devices that are activated or deactivated to keep the SNM hash table up-to-date.

Database Schema

The SNM hash table entry contains:

SNM Entry:
hardwareId=int4
sequenceNumber=int4

The hash table is keyed by hardwareId.

Assuming about 5 million BIA-equipped devices in service requires the hash table to be about 40 MB.

The SNM depends on the Valid Apparatus Database. When an apparatus is suspended or removed from the database, the SNM removes the corresponding entry. When an apparatus is activated, the SNM creates an entry for it.

The SNMs require a transmission bandwidth of about 8 KB per second to handle 1000 update sequence number messages per second. The update sequence number messages is buffered and sent out once per second to minimize the number of actual messages sent.

Apparatus Owner Database

The Apparatus Owner Database (AOD) stores information on users or organizations that own one or more BIA-equipped devices. This information is used to double check that the BIA devices are used only by their rightful owners, to provide financial account information for financial credit and debit transactions, and to allow identification of all BIAs owned by a specific user or organization.

Most BIA devices will be owned by sellers, i.e. sellers engaged in selling to users wishing to buy products.

Each AOD record includes a financial account to credit or debit the owner when the DPC processes a financial transaction submitted by one of the owner's BIA-equipped devices. For instance, transactions submitted from BLA attached to a retail point of sale terminal involves credits to the owner's financial account.

Database Schema

The schema for the Apparatus Owner record is:

ApparatusOwner:
ownerId=int4
name=char50
address=char50
ZipCode=char9
financialAccount=char 16
status=int1

The status field is one of:
0: suspended
1: active

The Apparatus Owner Database is keyed by ownerId.

The AOD is expected to store about 2 million Apparatus Owner records. Each entry is 130 bytes requiring about 260 MB of storage. The AOD is stored as a hashed file keyed by owner identification code. A copy of the AOD is stored on each GM.

When entries are removed or suspended from the AOD, any Valid Apparatus Database records that reference those apparatus owners are marked as suspended. In addition, the MAC Module and the Sequence Number Module remove their entries for the suspended apparatuses.

Valid Apparatus Database

The Valid Apparatus Database (VAD) is a collection of records representing all of the BIAS that have been manufactured to date. The VAD record contains the Message Authentication Code encryption key for each BIA, as well as an indication of whether a BIA is active, awaiting shipment, or marked as destroyed. In order for a message from a BIA to be decrypted, the BIA must exist and have an active record in the VAD.

When manufactured, each BIA has a unique public identification code. In addition, each BIA is injected with a unique MAC encryption key, and an initial DUKPT key, all of which are entered into the VAD record prior to BIA deployment.

When a BIA is first constructed, it is given a unique hardware identification code. When a BIA is placed in service, its hardware identification code is registered with the system. First, the owner or responsible party of the BIA is entered into the Apparatus Owner Database (AOD). Then, the VAD record is pointed to the AOD record, and the BIA is then set active. Messages from that BIA are accepted by the DPC.

When a BIA enters service, the installing agent performs an attendant security assessment, determining the relative attentiveness the organization pays towards fraud-fighting and the like. Likewise, the geography of the surrounding area is examined; high crime neighborhoods will merit a lower security value, for instance. These values are place in the VAD record for the device. These can change over time.

When a BIA is removed from service, it is marked as inactive, and the link to the AOD record is broken. No communications from that BIA are accepted.

Each BIA type and model has a device security assessment performed on it during its design and construction. This represents the basic ability of the device to resist attempts to monitor the BIA's internal functioning, the ability of the BIA to keep both past and current encryption keys stored on the BIA secret, and the BIA's ability to resist reprogramming by criminals.

The number of failed messages, recent messages, and the average number of messages performed by a given apparatus are recorded in the VAD record, to assist the security factors module in detecting fraudulent messages. Periodically, the recentReqs and the failedReqs fields are cleared.

Database Schema

The schema for the Valid Apparatus record is:

Valid Apparatus:
hardwareId=int4
macEncryptionKey=int 16
ownerId=int8
mfgDate=time
inServiceDate=time
devicesecurity=int2
locationSecurity=int2
attendentskill=int2
failedReqs=int2
recentReqs=int2
avgReqs=int2
status=int1
type=int1
use=int1

Possible values for the status field are:
0: suspended
1: active
2: destroyed

Possible values for the type field are (one for each type of terminal):
0: BRT
1: CPT
2: CST
3: IPT
4: IT
5: PPT
6: RPT Possible values for the use field are:
0: retail
1: personal
2: issuer
3: remote The Valid Apparatus Database is keyed by the hardware identification code.

The VAD handles about 5 million retail, issuer, and remote Valid Apparatus entries and/or 200,000 ATMs. Each entry is 51 bytes requiring about 255 MB total. The VAD is stored as a hashed file keyed by hardware identification code. A copy of the VAD is stored on each GM.

The number of personal Valid Apparatus entries number in the range of 30 million requiring an additional 1.5 GB of storage.

When a VAD record changes status, the MAC Modules and Sequence Number Modules are informed of its change in status. For instance, when an apparatus becomes active, the MACP and SNM adds an entry for the newly active apparatus. When an apparatus becomes inactive, the MACP and SNM remove their entry for the apparatus.

Individual Biometric Database

Individual Biometric Database (IBD) records store personal information on users for both identification as well as authentication. This information may include their primary and secondary biometrics, one or more biometric values, a list of financial accounts, perhaps an account index code, account index names, private code, one or more emergency account index codes, address, and phone number. The user may optionally include this SSN. This information is necessary for identifying a user either by biometric or personal information, for accessing related information, or for providing an address or phone number to remote sellers or banks for additional verification.

Users are added to the system during the user enrollment process at registered User Registration Terminals located in retail banking establishments worldwide, or in local system offices. During enrollment, users add financial accounts and any personal identification numbers, to their biometric and biometric sorting number combination.

The IBD exists on multiple machines, each of which is responsible for a subset of the IBD records with a copy of each record stored on two different machines, both for redundancy and for load-sharing. The IBD Machine List, stored on the GM, maintains which machines hold which biometric values. ** BSN??

Database Schema
The schema for the User Biometric record is:
UserBiometric:
primaryBiometric=biometric
secondaryBiometric=biometric
biometricId=int4
phoneNumber=char 12
lastName=char24
firstName=char24
middleInitial=char2
SSN=char9
privateCode=char40
address=char50
zipCode=char9
publicKey=char64
checksums=int4[10]
accountIndexCodes=char30[10]
accountIndexNames=char30[10]
emergencyIndexCode=char 1
emergencylink=char1
privs=char 10
enroller=int8
silentAlarmCount=int4
silentAlarmBehavior=int2
status=int 1
The status field is one of:
0: suspended
1: active
2: priorFraud
The IBD is keyed by the biometric value.

Each IBD machine, preferably, has additional indexes on the user's Social Security Number, last name, first name, and phone number to facilitate access to the IBD database.

Each IBD machine has 40 GB of secondary storage provided by one or more RAID devices. Each IBD record is 2658 bytes (assuming the biometrics are 1 K apiece) allowing up to 1.5 million records per machine. The IBD records are stored using a (sometimes clustered) secondary index on the biometric value. The index is stored in memory and requires no more than 64 MB (a 64 MB index handles about 16 million entries). To store records for 300 million users, the DPC needs at least 40 IBD machines: 20 IBD machines for main storage and another 20 for backup. The number of IBD machines is easily scaled up or down depending on the number of registered users.

The IBD machines, Biometric Group List, and the IBD Machine List remain up-to-date in terms of which biometric values are on which machine. When a biometric group is reconfigured or main and backup machines for biometric groups are changed, the IBD machines update their databases and indexes appropriately.

Authorized Individual Database
For each issuer or personal BIA-equipped device, the Authorized Individual Database (AID) maintains a list of users who are authorized, by the owner of the device, to use it.

The AID exists because it provides restricted access to a terminal. For example, the Issuer Terminal can only be used by an authorized bank representative. The second reason for the AID is to prevent criminals from secretly replacing the BIA in a retail point of sale terminal with that of a personal BIA from a phone Terminal and thus routing all purchases to a remote seller financial account set up by the criminals.

Database Schema
The schema for the Authorized Individual record is:
Authorized Individual:
hardwareId=int4
biometricId=int4
The hardwareId refers to a record in the Valid Apparatus Database and the biometricId refers to a record in the Individual Biometric Database. Whenever the DPC needs to check whether an individual is authorized to use a personal or issuer BIA device, the DPC checks for the existence of an Authorized Individual record with the correct hardwareId and biometricId.

Personal BIA devices are identified by a use field set to 1 (personal) in the Valid Apparatus Database. Issuer BIA devices are identified by a use field set to 2 (issuer) in the Valid Apparatus Database.

Remote Seller Database
The Remote Seller Database (RSD) stores information on sellers that provide goods or services over telephones, cable television networks, or the Internet. Each order sent by a user using a properly-equipped terminal is routed through the seller's order terminal to the system.

Once a user's remote electronic financial transaction is received and the MAC validated by the DPC, the seller identification code is compared against the seller identification code in the RSD. The seller identification code, be it phone number, seller-product credential. or Internet address, exists in the RSD record under the correct seller identification code or the DPC terminates the message and returns an invalid seller identification code error to the sending BIA terminal device.

Database Schema
The schema for the Remote Seller record is:
Remote Seller:
sellerId=int4
sellerCode=char 16
sellerType=int1
publicKey=int 16
The Remote Seller sellerType is one of:
0: telephone
1: CATV
2: Internet
The sellerId and sellerCode are both primary keys. No two RSD records have the same sellerId and sellerCode combination.

Assuming about 100,000 remote sellers, the RSD requires about 24 bytes per record for a total of about 2.4 MB storage required. The RSD does not have any direct dependencies on any other DPC components.

System Performance
In GM:
1. MACM checks the MAC (local)
2. SNM checks the sequence number (network message)

3. MDM decrypts the biometric block (local)

4. Find IBD machine (local)

5. Send identify message to the IBD machine (network message)

In IBD machine:

6. Retrieve all IBD records for the Biometric Value (x seeks and x reads, where x is the number of pages required to store the biometric records).

7. For each record, compare against its primary biometric (y/2 ms where y is the number of records retrieved).

8. If no reasonable match, repeat step 9 but compare against the secondary biometric (z*y/2 ms, where y is the number of records retrieved and z is the probability no match is found).

9. Update the best matching IBD record's checksum queue and check for possible replay attacks (1 seek, 1 read, and 1 write).

10. Return the best matching IBD record or an error if the match is not close enough (network message).

In GM:

11. Authorize message with an external processor (network message)

12. GM encrypts and MACs the response (local).

13. Sends response packet back (network message).

BSN Terminal Protocol Flowchart

The following set of protocol flows describe interactions between specific terminals, the DPC, the attached BIA, and other parties such as the credit/debit processor, and so on.

Use-Sensitive DPC Procedures

In another embodiment, the system has use-sensitive data processing capabilities, wherein frequent users of the system are on a local cache. This system comprises a master DPC having a master DPC comparison engine, also referred to as a comparator. The master DPC comparator further has a master user biometric database which contains or stores the biometric samples of all users registered with the identification computer system. The master DPC further comprises a user biometric group database which contains the BSNs of said users. BSNs of users may not necessarily be unique to the individual users, thus, more than one user can have the same BSN. The system further comprises at least two local DPCs which are physically apart from each other. Each local DPC further comprises a biometric scanner; a local comparator; a data entry device; and a local user biometric database containing a subset of the biometric samples contained in the master biometric database. Data communications lines allows messages to flow between each local DPC and the master DPC.

To perform an identification, the BIA sends the appropriate message to the local DPC, where the comparator compares the bid biometric sample against the subset of the registered biometric samples contained in the local DPC databases to produce either a failed or successful first identification result. If the local DPC returns a failed identification result, the bid biometric sample is transmitted to the master DPC for comparison of the entered bid biometric sample to the biometric samples stored in the master DPC for producing either a failed or successful second identification result. If both identifications fail, the person is not identified. Otherwise, the result of the first or second identification result is externalized from the identification computer system to the user by the BIA and/or terminal. If the local DPC could not identify the individual, but the master DPC could, the master DPC transmits the database record of the identified user to the local DPC. Therefore, in future bid biometric samples presented by the same individual, the local DPC will be able to identify the user without involving the master DPC.

In another embodiment of the invention the identification computer system further comprises a purge engine for deleting database records from the local DPC databases. In order to store only records for those individuals who use the system often and prevent the overload of databases with records from individuals who do not use the system often or use the local DPCs sparsely, the record of a user is deleted from the local DPC biometric databases if there has been no attempt to identify an individual upon expiration of a predetermined time limit.

The local DPCs further comprise at least one terminal apparatus that is functionally partially or fully integrated with the BIA; at least one key pad; and a communication mechanism (such as an ISA bus interface) for interconnecting the biometric scanner, terminal apparatus and the key pad.

In order to make communications between the master DPC and the local DPCs more safe, the system further comprises encryption and decryption means, wherein communications between the master DPC and local DPC are encrypted.

The master DPC is responsible for storage of the entire set of biometric samples registered with the computer system. Each master DPC is preferably made up of a number of computers and databases connected together over a LAN (known in the industry) as illustrated in the master DPC overview FIG. 2. Multiple identical master DPC sites ensure reliable service in the face of disaster or serious hardware failure at any single Master DPC site. Furthermore, each master, intermediary, and local DPC site has electrical power backup and multiple redundancy in all of its critical hardware and database systems.

It is preferred that the master and intermediary DPCs have a firewall machine which is the entry point of data and messages into these computers, and a gateway machine which is a system coordinator and message processor. For requests that require the master, intermediary, or local DPC to identify an individual, each of the indicated computers execute the following procedure: using the bid personal identification code, the computer searches the personal identification group list.

The computer retrieves all the IBD records for the submitted bid personal identification code. The comparator then compares each biometric sample contained in the individual's bid biometric. Preferably, if no biometric has a close enough comparison score, the comparisons are repeated using the secondary biometrics. If none of the secondary biometrics have a close enough comparison score, then the computer comparator returns an "individual not found" error. Otherwise, the IBD machine returns the full IBD record of the individual, from which such fields such as the private code, account numbers, titles, and so on are accessed.

The master DPC Local Area Network (LAN) links the machines of the master DPC sites together using a fiber optic token ring. The fiber optic token ring provides both high bandwidth and good physical security.

The network interfaces used by the machines on the DPC LAN include encryption hardware to make tapping or intercepting packets useless without the encryption key. The encryption key is the same for all machines on the LAN and is stored in the encryption hardware.

A properly configured network sniffer acts as an intruder detector as backup for the FW. If an anomalous message is detected, the intruding messages are recorded in their entirety, an operator is alerted, and the FW is physically shut down by the sniffer.

Firewall Machine

The FW Machines provide a first line of defense against network viruses and computer backers. All communication links into or out of the DPC site first pass through a secure FW Machine.

The FW Machine, an Internet-localnet router, only handles messages destined for the GM Machines. BIA-equipped terminals send packets to a single DPC site via modem, X.25, or other communication medium. The DPC relies on a third party to supply the modem banks required to handle the volume of calls and feed the data onto the DPC backbone.

For DPC to DPC communication, primarily for distributed transactions and sequence number updates, the FW Machines send out double-length DES encrypted packets. The DPC LAN component handles the encryption and decryption: the FWs do not have the ability to decrypt the packets.

A properly configured network sniffer acts as an intruder detector as backup for the FW. If an anomalous message is detected, the intruding messages are recorded in their entirety, an operator is alerted, and the FW is physically shut down by the sniffer. The FW disallows any transmissions from the internal network to the rest of the Internet.

An electronic financial transaction message requires about 400 bytes and registration packets require about 2 KB. To handle 1000 electronic financial transactions per second and 1 registration packet per second, the FW Machines are able to process about 400 KB per second. Each DPC site requires an aggregate bandwidth of nearly three T1 connections to the third party modem bank and the other DPC sites.

Gateway Machine

The GM Machine (GM), through the FW Machines, link the outside world (BIA-equipped terminals and other DPCs) to the internal components of the DPC. The DPC has multiple GMs, typically two.

The GM supervises the processing of each BIA message, communicates with the various DPC components as necessary, and sends the encrypted results of the message back to the sender. The software performing this task is called the Message Processing Module.

The GM logs all messages it receives and any warnings from components it communicates with. For example, the GM logs any silent alarms, sequence number gaps, and invalid packets.

Processing a message may require the GM to inform GMs at all other DPCs of a change in the DPC databases. When this happens, the GM runs a distributed transaction to update the remote databases.

Distributed transactions fall into two categories: synchronous and asynchronous. Synchronous distributed transactions require the GM to wait for the distributed transaction to commit before continuing to process the packet. Asynchronous distributed transactions do not require the GM to wait for the commit, and allow it to finish processing the message regardless of whether the distributed transaction commits or not. Asynchronous distributed transactions are only used to update data for which database consistency is not an absolute requirement: sequence numbers and biometric checksum recordings may be performed asynchronously, whereas creating database records, such as User Biometric records, may not.

When executing a synchronous distributed transaction, the requesting GM only considers the entire transaction successful if all sites can successfully commit the transaction locally. Otherwise, the GMs back out the changes locally and reject the request due to a transaction error.

The list of valid DPC sites is normally all of the sites. In the case of an extreme site failure, however, a system administrator may manually remove that site from the valid site list. The most likely cause of distributed transaction failures, however, are temporary network failures that are unrelated to any DPC equipment. Messages that require a synchronous distributed transaction cannot be performed until network connectivity is restored or the site is removed from the valid site list. Before a site can be added back to the valid site list, the system administrator brings the site's databases up to date with those of a currently active site.

Software Components

Each GM runs the following software components locally for performance reasons:

Message Processing Module
Message Authentication Code Module
Message Decrypt Module
Individual Biometric Database Machine List The message bandwidth required by the GMs is similar to that required by the FW Machines. A FDDI network interface provides 100 MBits per second and easily covers any bandwidth requirements.

From the foregoing, it will be appreciated how the objects and features of the invention are met.

First, the invention provides a computer identification system that eliminates the need for a user to possess and present a physical object, such as a token, in order to authorize a transaction.

Second, the invention provides a computer identification system that is capable of verifying a user's identity, as opposed to verifying possession of proprietary objects and information.

Third, the invention verifies the user's identity based upon one or more unique characteristics physically personal to the user.

Fourth, the invention provides an identification system that is practical, convenient, and easy use.

Fifth, the invention provides a system of secured access to a computer system that is highly resistant to fraudulent transaction authorization attempts by non-authorized users.

Sixth, the invention provides a computer identification system that enables a user to notify authorities that a particular access request is being coerced by a third party without giving notice to the third party of the notification.

Although the invention has been described with respect to a particular tokenless identification system and method for its use, it will be appreciated that various modifications of the apparatus and method are possible without departing from the invention, which is defined by the claims set forth below.

What is claimed is:

1. A method for tokenless authorization of commercial transactions between a user and a seller using a computer system, the method comprising the steps of:

a. a user registration step, wherein the user registers with the computer system at least one registration biometric sample and at least one user financial account;

b. a seller registration step, wherein the seller registers with the computer system at least one seller financial account;

c. a proposal step, wherein the seller offers a proposed commercial transaction to the user, the proposed commercial transaction comprising price information;

d. a transmission step, wherein the user's personal identification information comprising at least a bid biometric sample is forwarded to the computer system;

e. a user identification step, wherein the computer system compares the bid biometric sample with registration biometric samples for producing either a successful or failed identification of the user; and f. a payment step, wherein a financial account of the user is debited and a financial account of the seller is credited, wherein a commercial transaction is conducted without the user having to use any smartcards or swipe cards.

2. The method of claim 1, further comprising an acceptance step, wherein the user signals acceptance of the seller's proposed commercial transaction by adding to the proposed commercial transaction the user's personal identification information comprising the bid biometric sample, wherein the bid biometric sample is obtained from the user's person.

3. The method of claim 2 wherein during the user registration step, the user registers at least one user financial account and assigns an account index code to each user financial account, and during the acceptance step the user adds the account index code to the commercial transaction message, wherein the account index code further comprises one or more alphanumeric characters.

4. The method of claim 3, further comprising a user resource determination step, wherein after successful identification of the user, a determination is made if the user has sufficient resources to pay for the transaction using the account index code that was added to the commercial transaction message to select the corresponding user financial account.

5. The method of claim 3 wherein the registration step further comprises assigning an account index name to an account index code.

6. The method of claim 5 further comprising an account name display step, wherein a list of accounts with their account index names can be retrieved and displayed to the user after a successful identification, wherein no transaction needs to take place if it is desired that the account index names be retrieved.

7. The method of claim 1 wherein during the payment step, a credit authorization draft is created detailing an agreement to pay the seller from the user's financial account up to an amount specified during the proposal step, whereby transactions can be conducted when the exact amount to be transferred is not known at the time of authorization or when a deposit is required but the account may not ever be debited.

8. The method of claim 1 further comprising a user resource determination step, wherein after successful identification of the user, a determination is made if the user has sufficient resources to pay for the transaction.

9. The method of claim 1 wherein the price information comprises any combination of the following: a list of goods and services, a seller name, a date and time, a location, or an invoice number.

10. The method of claim 2 wherein the acceptance step further comprises the user entering an amount that is the sum of a cash back value to the proposed transaction amount.

11. The method of claim 1 further comprising a user re-registration check step, wherein the user's registration biometric samples are compared against previously designated biometric samples of certain users wherein if a match occurs, the computer system is alerted to the fact that the user has re-registered, whereby users who perpetrate fraud on the system can be automatically identified from their biometrics alone if and when they re-register.

12. The method of claim 1 wherein the biometric sample comprises one of the following: a fingerprint, a retinal image, and a voice print.

13. The method of claim 1, further comprising a presentation step, wherein any combination of the results of steps a) through f) are presented to the user or seller.

14. The method of claim 1, wherein the transmission step forwards the bid biometric sample to the computer system in the absence of the user financial account.

15. The method of claim 1, wherein the seller registration step includes identifying the seller by a hardware identification code stored in a biometric input apparatus.

16. The method of claim 15, wherein the proposal step includes adding the hardware identification code of the biometric input apparatus to the proposed commercial transaction.

17. The method of claim 1, wherein the transmission step includes forwarding the proposed commercial transaction to the computer system, the proposed commercial transaction including the bid biometric sample.

18. The method of claim 8 wherein during both the resource determination step and the payment step the computer system communicates with one or more external computer systems in order to perform any combination of the following steps: the resource determination or the construction of the credit authorization draft.

19. The method of claim 1, wherein the user identification step is completed by the computer system after the comparison of the bid biometric sample with the registration biometric samples.

20. The method of claim 19, wherein the user identification step is completed without transmitting any information from the computer system to the user or seller.

21. The method of claim 19, further comprising an account selection step, wherein the user selects the financial account to be debited from a plurality of financial accounts registered with the computer system.

* * * * *

UNITED STATES PATENT AND TRADEMARK OFFICE
CERTIFICATE OF CORRECTION

PATENT NO. : 7,319,987 B1
APPLICATION NO. : 09/215058
DATED : January 15, 2008
INVENTOR(S) : Ned Hoffman et al.

Page 1 of 1

It is certified that error appears in the above-identified patent and that said Letters Patent is hereby corrected as shown below:

Column 8, line 32, the word "BLA/PC" should read -- BIA/PC --;
Column 8, line 34, the word "BLA/Registration" should read
-- BIA/Registration --;
Column 8, line 44, the word "BLA" should read -- BIA --;
Column 12, line 17, the word "BLA/ATM" should read -- BIA/ATM --;
Column 12, line 21, the word "BLA/ATM" should read -- BIA/ATM --;
Column 24, line 20, delete the words "** Check This";
Column 27, line 4, the word "BLA" should read -- BIA --;
Column 29, line 17, delete the words "** BSN??";
Column 33, line 6, the word "backers" should read -- hackers --;
Column 33, line 33, the word "Tl" should read -- T1 --.

Signed and Sealed this

Twelfth Day of May, 2009

JOHN DOLL
*Acting Director of the United States Patent and Trademark Office*